(12) United States Patent
Brusilovski et al.

(10) Patent No.: US 12,290,978 B2
(45) Date of Patent: May 6, 2025

(54) SYSTEM FOR 3D PRINTING

(71) Applicant: Stratasys Ltd., Rehovot (IL)

(72) Inventors: Gregory Brusilovski, Kfar-Saba (IL); Uri Grach, MaAle Adumim (IL); Boaz Max Perek, Rehovot (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 18/383,494

(22) Filed: Oct. 25, 2023

(65) Prior Publication Data

US 2024/0051220 A1      Feb. 15, 2024

Related U.S. Application Data

(60) Division of application No. 17/363,137, filed on Jun. 30, 2021, now Pat. No. 11,820,069, which is a
(Continued)

(51) Int. Cl.
| | |
|---|---|
| *B29C 64/112* | (2017.01) |
| *B29B 13/02* | (2006.01) |
| *B29C 35/02* | (2006.01) |
| *B29C 64/209* | (2017.01) |
| *B29C 64/295* | (2017.01) |
| *B29C 64/336* | (2017.01) |

(Continued)

(52) U.S. Cl.
CPC .......... *B29C 64/112* (2017.08); *B29B 13/022* (2013.01); *B29C 64/209* (2017.08); *B29C 64/295* (2017.08); *B29C 64/336* (2017.08); *B29C 64/393* (2017.08); *B29C 67/0007* (2013.01); *B33Y 10/00* (2014.12); *B33Y 30/00* (2014.12); *B33Y 40/00* (2014.12); *B33Y 40/10* (2020.01); *B29C 2035/0283* (2013.01)

(58) Field of Classification Search
CPC ...................................................... B29C 64/112
See application file for complete search history.

(56) References Cited

U.S. PATENT DOCUMENTS

| | | |
|---|---|---|
| 5,506,607 A | 4/1996 | Sanders, Jr. et al. |
| 6,259,962 B1 | 7/2001 | Gothait |
| | (Continued) | |

FOREIGN PATENT DOCUMENTS

| | | |
|---|---|---|
| CN | 103358550 | 10/2013 |
| CN | 103407163 | 11/2013 |
| | (Continued) | |

OTHER PUBLICATIONS

European Search Report and the European Search Opinion Dated May 7, 2020 From the European Patent Office Re. Application No. 20150374.5. (8 Pages).
(Continued)

*Primary Examiner* — Jacob T Minskey
*Assistant Examiner* — Wayne K. Swier

(57) ABSTRACT

An additive manufacturing (AM) system includes a carriage that deposits material in a defined pattern and a building platform that receives material deposited from the carriage. The carriage includes a pre-heating assembly with a plurality of pre-heating chambers and a printing block with a plurality of slots for receiving a plurality of printing heads. The carriage is equipped with more pre-heating chambers than head slots.

19 Claims, 18 Drawing Sheets

Related U.S. Application Data continuation of application No. 15/746,808, filed as application No. PCT/IL2016/050837 on Aug. 1, 2016, now Pat. No. 11,117,310.

(60) Provisional application No. 62/200,061, filed on Aug. 2, 2015.

(51) Int. Cl.
*B29C 64/393* (2017.01)
*B29C 67/00* (2017.01)
*B33Y 10/00* (2015.01)
*B33Y 30/00* (2015.01)
*B33Y 40/00* (2020.01)
*B33Y 40/10* (2020.01)

(56) References Cited

U.S. PATENT DOCUMENTS

| | | | |
|---|---|---|---|
| 6,569,373 | B2 | 5/2003 | Napadensky |
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait |
| 7,300,619 | B2 | 11/2007 | Napadensky et al. |
| 7,364,686 | B2 | 4/2008 | Kritchman |
| 7,500,846 | B2 | 3/2009 | Eshed et al. |
| 7,658,976 | B2 | 2/2010 | Kritchman |
| 7,962,237 | B2 | 6/2011 | Kritchman |
| 8,781,615 | B2 | 7/2014 | Kritchman et al. |
| 9,031,680 | B2 | 5/2015 | Napadensky |
| D739,885 | S | 9/2015 | Lee et al. |
| D759,980 | S | 6/2016 | Toth |
| D765,745 | S | 9/2016 | Cheung |
| D768,214 | S | 10/2016 | Cho et al. |
| D784,167 | S | 4/2017 | Fujiuchi et al. |
| D784,994 | S | 4/2017 | Fujiuchi et al. |
| D785,626 | S | 5/2017 | Fujiuchi et al. |
| D785,627 | S | 5/2017 | Fujiuchi et al. |
| D785,629 | S | 5/2017 | Fujiuchi et al. |
| D786,950 | S | 5/2017 | Armani et al. |
| 2004/0006405 | A1 | 1/2004 | Chen et al. |
| 2005/0069784 | A1* | 3/2005 | Gothait .............. B33Y 10/00 700/98 |
| 2012/0267827 | A1 | 10/2012 | Kritchman et al. |
| 2013/0040091 | A1 | 2/2013 | Dikovsky et al. |
| 2013/0073068 | A1 | 3/2013 | Napadensky |
| 2013/0287933 | A1 | 10/2013 | Kaiser et al. |
| 2014/0027950 | A1* | 1/2014 | Stockwell .......... B29C 71/0009 106/230 |
| 2014/0113017 | A1 | 4/2014 | Kraibuhler et al. |
| 2015/0035186 | A1 | 2/2015 | Teken et al. |
| 2015/0140147 | A1 | 5/2015 | Konstantinos et al. |
| 2015/0173203 | A1 | 6/2015 | Din |
| 2015/0352789 | A1 | 12/2015 | Haider et al. |
| 2016/0009029 | A1 | 1/2016 | Cohen et al. |
| 2016/0052207 | A1 | 2/2016 | Bloom |
| 2016/0067740 | A1 | 3/2016 | Voris et al. |
| 2016/0200051 | A1 | 7/2016 | Urbanic |
| 2016/0236409 | A1 | 8/2016 | Armani et al. |
| 2018/0169941 | A1 | 6/2018 | Taniguchi et al. |
| 2019/0084219 | A1 | 3/2019 | Brusilovski |
| 2021/0323218 | A1 | 10/2021 | Brusilovski et al. |

FOREIGN PATENT DOCUMENTS

| | | |
|---|---|---|
| CN | 104254446 | 12/2014 |
| CN | 104708809 | 6/2015 |
| CN | 105722663 | 6/2016 |
| JP | 2015-515395 | 5/2015 |
| WO | WO 2013/132484 | 9/2013 |
| WO | WO 2017/021957 | 2/2017 |

OTHER PUBLICATIONS

Final Official Action Dated Dec. 31, 2020 from the US Patent and Trademark Office Re. U.S. Appl. No. 15/746,808. (18 pages).
International Preliminary Report on Patentability Dated Feb. 15, 2018 From the International Preliminary Examining Authority Re. Application No. PCT/IL2016/050837. (7 Pages).
International Search Report and the Written Opinion Dated Nov. 29, 2016 From the International Searching Authority Re. Application No. PCT/IL2016/050837.
Interview Summary Dated Mar. 29, 2021 From the US Patent and Trademark Office Re. U.S. Appl. No. 15/746,808. (3 Pages).
Invitation Pursuant to Rule 137(4) EPC and Article 94(3) EPC Dated Jun. 9, 2023 From the European Patent Office Re. Application No. 20150374.5. (3 Pages).
Notice of Allowance Dated Jul. 19, 2023 from the US Patent and Trademark Office Re. Application No. 17/363,137. (12 pages).
Notice of Allowance Dated Dec. 22, 2017 From the US Patent and Trademark Office Re. U.S. Appl. No. 29/553,007. (6 pages).
Notice of Allowance Dated Dec. 27, 2017 From the US Patent and Trademark Office Re. U.S. Appl. No. 29/553,008. (6 pages).
Notice of Allowance Dated Apr. 28, 2021 from the US Patent and Trademark Office Re. U.S. Appl. No. 15/746,808. (9 pages).
Notice of Reason for Rejection Dated Jul. 21, 2020 From the Japan Patent Office Re. Application No. 2018-505405. (2 Pages).
Notice of Reasons for Rejection Dated Dec. 1, 2020 From the Japan Patent Office Re. Application No. 2018-505405 and Its Translation Into English. (3 Pages).
Notice of Reasons for Rejection Dated Mar. 23, 2021 From the Japan Patent Office Re. Application No. 2018-505405 and Its Translation Into English. (4 Pages).
Notification of Office Action and Search Report Dated Jun. 15, 2021 From the State Intellectual Property Office of the People's Republic of China Re. Application No. 201911271045.1. (8 Pages).
Notification of Office Action and Search Report Dated Apr. 22, 2019 From the State Intellectual Property Office of the People's Republic of China Re. Application No. 201680044854.7. (5 Pages).
Official Action Dated Aug. 10, 2017 From the US Patent and Trademark Office Re. U.S. Appl. No. 29/553,007. (11 Pages).
Official Action Dated Aug. 10, 2017 From the US Patent and Trademark Office Re. U.S. Appl. No. 29/553,008. (12 Pages).
Official Action Dated Apr. 15, 2020 from the US Patent and Trademark Office Re. U.S. Appl. No. 15/746,808. (17 pages).
Official Action Dated Jan. 20, 2023 from the US Patent and Trademark Office Re. U.S. Appl. No. 17/363,137. (32 pages).
Restriction Official Action Dated Nov. 7, 2019 From the US Patent and Trademark Office Re. U.S. Appl. No. 151746,808. (7 pages).
Translation Dated May 2, 2019 of Notification of Office Action Dated Apr. 22, 2019 From the State Intellectual Property Office of the People's Republic of China Re. Application No. 201680044854. 7. (1 Page).
Translation Dated Aug. 10, 2020 of Notice of Reason for Rejection Dated Jul. 21, 2020 From the Japan Patent Office Re. Application No. 2018-505405. (2 Pages).

* cited by examiner

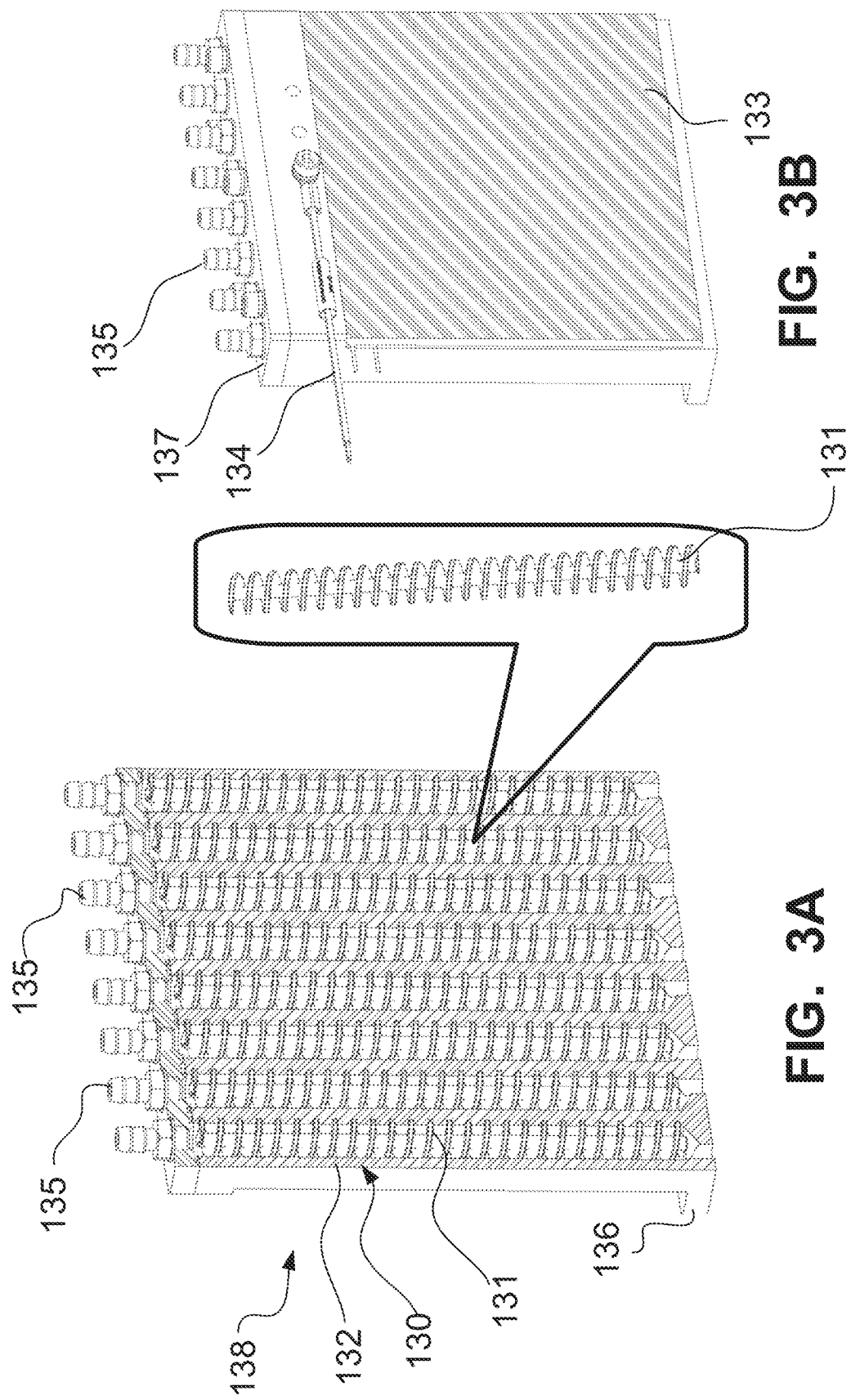

SYSTEM FOR 3D PRINTING

RELATED APPLICATIONS

This application is a division of U.S. patent application Ser. No. 17/363,137 filed on Jun. 30, 2021, now U.S. Pat. No. 11,820,069, which is a continuation of U.S. patent application Ser. No. 15/746,808 filed on Jan. 23, 2018, now U.S. Pat. No. 11,117,310, which is a National Phase of PCT Patent Application No. PCT/IL2016/050837 having International Filing Date of Aug. 1, 2016, which claims the benefit of priority under 35 USC § 119(e) of U.S. Provisional Patent Application No. 62/200,061 filed on Aug. 2, 2015. The contents of the above applications are all incorporated by reference as if fully set forth herein in their entirety.

FIELD AND BACKGROUND OF THE INVENTION

The present invention, in some embodiments thereof, relates to freeform manufacturing and, more particularly, but not exclusively, to a three dimensional (3D) printing.

Additive manufacturing (AM) is generally a process in which a 3D object is manufactured utilizing a computer model of the object. Such a process is used in various fields, such as design related fields for purposes of visualization, demonstration and mechanical prototyping, as well as for rapid manufacturing.

The basic operation of any AM system consists of slicing a 3D computer model into thin cross sections, translating the result into two-dimensional position data and feeding the data to a controller of a system that constructs a 3D structure in a layer-wise manner.

AM entails many different approaches to the method of fabrication, including 3D inkjet printing, laminated object manufacturing, fused deposition modeling and others.

In 3D printing processes, for example, a building material is dispensed from a carriage including one or more printing heads. Each of the printing heads has a set of nozzles from which material can be selectively dispensed on a supporting structure to form one layer at a time. Depending on the building material, the layers may then be cured or solidified using a suitable device that is also carried on the carriage. The building material may include modeling material, which forms the object, and support material, which supports the object as it is being built. The carriage scans the supporting structure and patterns it. Various 3D printing techniques are disclosed in, e.g., U.S. Pat. Nos. 6,259,962, 6,569,373, 6,658,314, 6,850,334, 7,183,335 7,209,797, 7,225,045, 7,300,619, 7,364,686, 7,500,846, 7,658,976, 7,962,237, 8,781,615 and 9,031,680, and U.S. Application Publication Nos. 20130040091 and 20150035186, all of the same Assignee, the contents of which are hereby incorporated by reference.

For example, U.S. Pat. No. 8,781,615 entitled "Rapid Production Apparatus with Production Orientation Determination" discloses a method of producing an object by sequentially printing layers of construction material one on top of the other.

The method includes providing the construction material at a first lower temperature, flowing the construction material through a heated flow path in a flow structure to heat the construction material and delivering the heated construction material to a heated reservoir in a printing head. The heated construction material is then dispensed from the reservoir to build the object layer by layer. In one example it is described that one or more spiral shaped flow channels are used to provide sufficient length to enable efficient heat transfer to the flowing material.

U.S. Patent Application Publication No. 20150035186 entitled "System and Method for Depositing Liquids," describes a printing head for a printing system. The printing head comprises a plurality of compartments, each having an outlet port for depositing liquid and an inlet port separately connectable to a separate liquid container. At least two compartments are in controllable fluid communication with each other, and the printing head comprises an arrangement of sensors configured for generating signals indicative of (i) a filling state of each compartment, and (ii) a fluid communication state between the at least two compartments. Optionally, at least two compartments occupy a chamber and are separated by at least a partition, and wherein said fluid communication is via a liquid passage in said chamber.

SUMMARY OF THE INVENTION

According to an aspect of some embodiments of the present invention there is provided a 3D printer that provides full color printing, printing with a broad array of mechanical properties and/or printing with a broad range of different materials using relatively few printing heads. Optionally, each printing head simultaneously dispenses two different materials during printing. According to some embodiments of the present invention, a carriage of the 3D printer has a compact design that provides for significantly increasing the range of building material without increasing or significantly increasing the size of the carriage of the printer.

According to an aspect of some embodiments of the present invention there is provided an additive manufacturing (AM) system comprising: a carriage comprising: a pre-heating assembly comprising a plurality of pre-heating chambers; and a printing block comprising a plurality of slots for receiving a plurality of printing heads, wherein the carriage includes more pre-heating chambers than head slots; and a building platform configured to receive material deposited from the carriage.

Optionally, the printing block is formed with a pair of reservoirs configured to be in fluid communication with one of the plurality of printing heads when installed in one of the plurality of slots.

Optionally, printing block is formed with a pair of reservoirs surrounding each of the plurality of slots, wherein each pair is configured to be in fluid communication with one of the plurality of printing heads installed in the printing block.

Optionally, each of the pair is configured to be in fluid communication with a separate nozzle array of the one of the plurality of printing heads.

Optionally, each of the plurality of pre-heating chambers is in fluid communication with one of the reservoirs formed in the printing block.

Optionally, the pair is separated by a separating wall.

Optionally, the separating wall is configured to allow selected flooding between the pair of reservoirs.

Optionally, the plurality of printing heads is configured to simultaneously receive material from all the plurality of pre-heating chambers.

Optionally, the system includes heating plates installed on two opposite facing surfaces of the printing block.

Optionally, at least one of the plurality of pre-heating chambers includes a worm screw channel configured to direct material through the one of the plurality of pre-heating chambers.

Optionally, the worm screw is formed from a heat conductive material.

Optionally, the material is directed from a pre-heating chamber to a printing head reservoir via a dedicated block cover channel.

Optionally, each of the plurality of pre-heating chambers includes a worm screw.

Optionally, the carriage includes a hardening unit configured to harden a layer of material dispensed on the building platform.

Optionally, the carriage includes a leveling device configured to level a layer of material dispensed on the building platform.

Optionally, the AM system is a three dimensional ink-jet printer.

Optionally, the pre-heating assembly is divided into a first section including a first pre-heating chamber and a second section including a second plurality of pre-heating chamber, wherein the first section is pre-heated with a first heating element and wherein the second section is heated with a second separate heating element.

Optionally, the printing block includes a least one reservoir associated with each of the slots and wherein the printing block includes openings that are configured to thermally insulate material received in one of the reservoirs from material received in other reservoirs of the printing block.

Optionally, the pre-heating assembly is divided into at least a first section and a second section, wherein the first section includes a first pre-heating chamber and the second section includes a second pre-heating chamber, and wherein the first section is pre-heated with a first heating element and the second section is heated with a second separate heating element.

According to an aspect of some embodiments of the present invention, there is provided a method comprising: heating a plurality of different materials in separate chambers; simultaneously delivering contents of each of the plurality of different materials to a plurality of printing heads, wherein the plurality of different materials exceeds in number the plurality of printing heads; and dispensing all the plurality of different materials with the printing heads by three dimensional inkjet printing.

Optionally, each of the plurality of different materials is directed to the printing heads via dedicated pairs of reservoirs formed in the printing block configured to hold the printing heads, wherein each pair is in fluid communication with one of the plurality of printing heads.

Optionally, the method includes simultaneously directing material from the pair of reservoirs to separate nozzle arrays of the printing head.

Optionally, the method includes directing the material from the base of a pre-heater worm screw via a dedicated block cover channel to a printing head reservoir.

Optionally, one of the plurality of different materials is heated to a first temperature and another of the plurality of different materials is heated to a second temperature.

Optionally, the one of the plurality of different materials is support material and the other of the plurality of different materials is modeling material.

Optionally, the support material is heated to a temperature that is 2-10 degrees lower than the modeling material.

Optionally, the support material is heated and maintained at a temperature of 65° C. and the modeling material is heated and maintained at a temperature of 70° C.

Optionally, yet another of the plurality of different materials is heated to a third temperature.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-3B are exemplary front and back perspective views showing internal components of a pre-heater for an AM system in accordance with some embodiments of the present invention;

DESCRIPTION OF SPECIFIC EMBODIMENTS OF THE INVENTION

Figure 1:
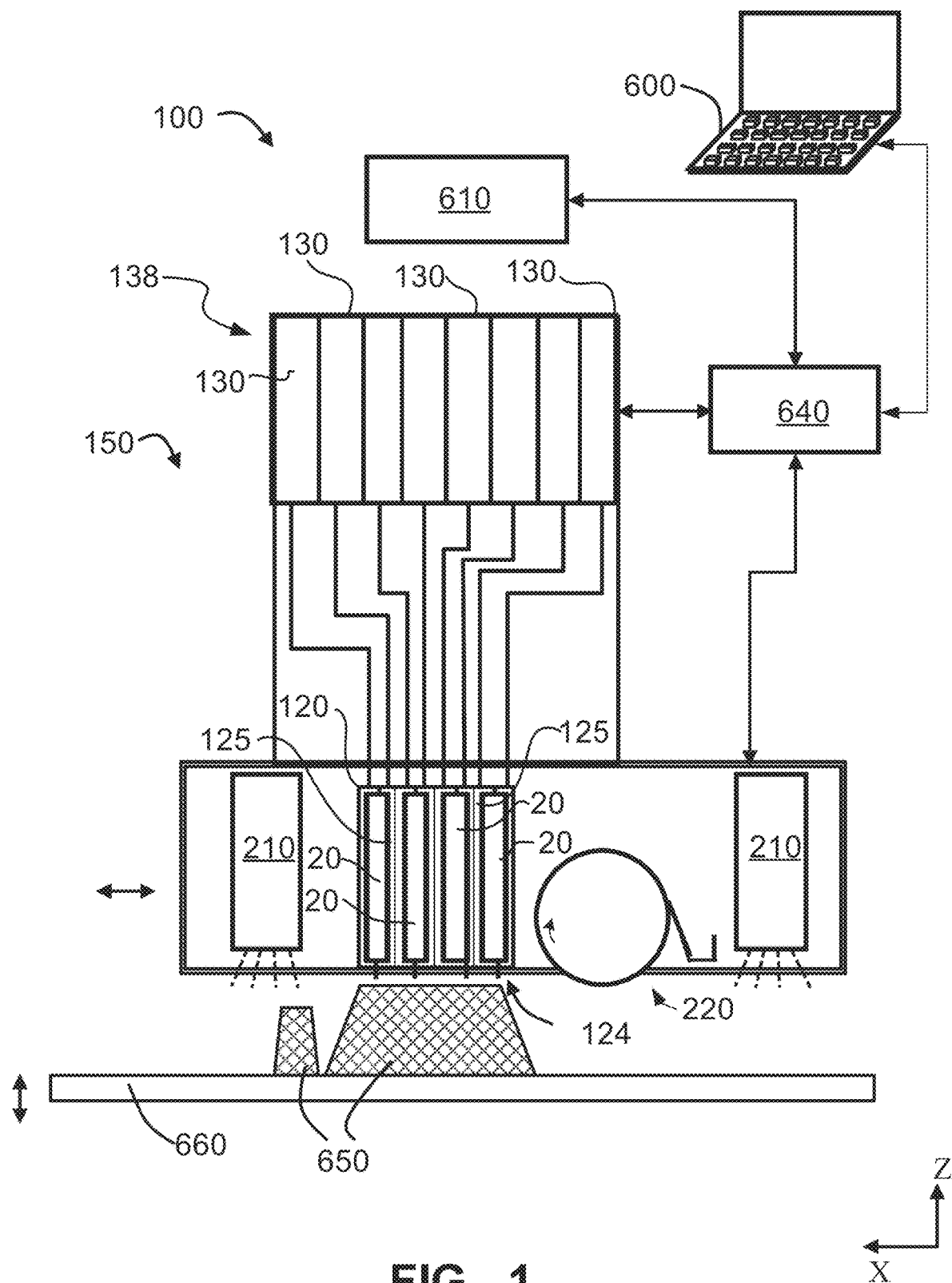
FIG. 1 is a simplified block diagram of an AM system in accordance with some embodiments of the invention.

The present invention, in some embodiments thereof, relates to freeform manufacturing and, more particularly, but not exclusively, to a three dimensional (3D) printing.

According to some embodiments of the present invention, an AM system provides for simultaneously feeding building material from two different sources to a single printing head and for simultaneously printing material from the two different sources with the single printing head. In some exemplary embodiments, up to eight different materials are simultaneously delivered to four printing heads installed in a carriage of the AM system. Optionally, three of the printing heads are operated to print with six different colored resins and a forth printing head is operated to print support material.

Prior to delivering the materials to the printing heads, each of the building materials is pre-heated in a separate pre-heat chamber that is carried on the carriage of the AM system. Each of the pre-heat chambers is required to provide sufficient length to enable efficient heat transfer to the flowing material. Typically, it is desirable to have a compact construction for the carriage and therefore the number of separate pre-heat chambers that can be included in the carriage may be limited. The present inventors have found the volume of each of the pre-heat chambers required to pre-heat the building material may be reduced by channeling the building material around a worm screw-shaped runner. In some exemplary embodiments, a worm screw runner with a diameter that substantially matches a diameter of the pre-heat chamber is installed in each of the pre-heat chambers. The liquid building material runs downwards around the worm screw. By reducing the volume required for each pre-heat chamber, more pre-heat chambers can be added to a same size carriage and thereby compactness of the AM system is improved. In some exemplary embodiments, the pre-heat system includes two or more thermally independent sections that provide for simultaneously pre-heating each section to a different temperature. Optionally, the pre-heat system provides for heating the support material chambers to a first temperature and heating the modeling material to a different temperature, e.g. higher temperature. Optionally, the pre-heat system may heat each of the chambers to a different pre-defined temperature.

The printing heads are typically installed in a printing block that is carried on the carriage. According to some embodiments of the present invention, the printing block is formed of a slot for each printing head as well as a pair of reservoirs surrounding each of the slots. According to some embodiments of the present invention, outflow from each of the pre-heat chambers is directed to one of the reservoirs and the material feed into the reservoir is directed to a printing head via one or more outputs formed in the reservoir. Typically, material fed into one of a pair of reservoirs provides material for printing through a first array of nozzles of a printing head and material fed into the other one of the pair of reservoirs provides material for printing through an alternate array of nozzles of that printing head. In some exemplary embodiments, a baffle separating the pair of reservoirs is sized to allow controlled overflow of material between the pair of reservoirs.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

The method and system of the present embodiments manufacture 3D objects based on computer object data in a layer-wise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an AM apparatus that includes a carriage which scans a two-dimensional surface in passes and patterns it. While scanning, the carriage visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention, the AM comprises 3D printing, more preferably 3D inkjet printing. In these embodiments a building material is dispensed from a dispensing head having a set of nozzles to deposit building material in layers on a supporting structure. The AM apparatus thus dispenses building material in target locations which are to be occupied and leaves other target locations void. The types of building materials can be categorized into two major categories: modeling material and support material. The support material serves to form a supporting matrix or construction for supporting the object or object parts during the fabrication process and/or other purposes, e.g., providing hollow or porous objects. Support constructions or matrices may additionally include modeling material elements, e.g. for further support strength.

The modeling material is generally a composition which is formulated for use in AM and which is able to form a 3D object on its own, i.e., without having to be mixed or combined with any other substance.

The final 3D object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing a plurality of different modeling materials, e.g. different colored resins.

The materials are optionally and preferably deposited in layers during the same pass of the printing heads. The materials and combination of materials within the layer are selected according to the desired properties of the object.

Reference is now made to FIG. 1 showing a simplified block diagram of an AM system in accordance with some embodiments of the invention. Typically, AM system 100 is a 3D droplet deposition system, e.g. inkjet printing apparatus.

Typically, AM system 100 includes carriage 150 that scans a building surface or tray 660. Typically, carriage 150 carries a pre-heating assembly 138 comprising a plurality of pre-heat chambers 130 for pre-heating the building material, a plurality of printing heads 20 for selectively depositing material on tray 660, a leveling device 220 for leveling a printed layer and one or more hardening devices 210 for hardening the printed layer. Printing heads 20 are typically secured on a printing block 120.

Carriage 150 is preferably operative to reciprocally move over tray 660, which serves as the working surface. Tray 660 is positioned horizontally. According to the common conventions, an X-Y-Z Cartesian coordinate system is selected such that the X-Y plane is parallel to tray 660. In use in some exemplary embodiments, carriage 150 moves in a scanning direction, which is referred to herein as the X direction, and printing heads 20 selectively dispense building material in a predetermined configuration in the course of their passage over tray 660. The building material typically comprises one or more types of support material and one or more types of modeling material. The passage of printing heads 20 is followed by hardening, e.g. curing of the modeling material (s) with one of hardening devices 210. In the reverse passage of the carriage 150, back to its starting point for the layer just deposited, an additional dispensing of building material may be carried out, according to predetermined configuration and the other of the hardening devices 210 is operated. In the forward and/or reverse passages of carriage 150, the layer formed may be straightened by leveling device 220, which preferably follows the path of printing heads 20 in their forward and/or reverse movement. Once carriage 150 returns to its starting point along the X direction, it may move to another position along an indexing direction, referred to herein as the Y direction, and continue to build the same layer by reciprocal movement along the X direction. Alternately, carriage 150 may move in the Y direction between forward and reverse movements or after more than one forward-reverse movement. The series of scans performed by the dispensing heads to complete a single layer is referred to herein as a single scan cycle.

Once the layer is completed, tray 660 may be lowered in the Z direction to a predetermined Z level, according to the desired thickness of the layer subsequently to be printed. The procedure is repeated to form 3D object 650 in a layer-wise manner. Alternatively, carriage 150 may move in the Z-direction according to the desired thickness of the layer.

A control unit 640 controls operation of the elements included in carriage 150. Control unit 640 typically includes an electronic circuit configured to perform the controlling operations. Control unit 640 preferably communicates with a processor 600 which transmits digital data pertaining to fabrication instructions based on computer object data, e.g., a CAD configuration represented on a computer readable medium in a form of a Standard Tessellation Language (STL) format or the like. Typically, processor 600 includes a memory unit and/or memory capability for storing computer object data and for storing data pertaining to fabrication instructions based on computer object data. Typically, control unit 640 controls the voltage applied to each printing head 20 or nozzle array 124 and the temperature of the building material both in the pre-heat chambers 130 and printing block 120.

Once the manufacturing data is loaded to control unit 640 it can operate without user intervention. In some embodiments, control unit 640 receives additional input from the operator, e.g., using data processor 600 or using a user interface 610 communicating with unit 640.

During operation, building material is supplied to pre-heat chambers 130 for pre-heating and then fed to printing heads 20 via a plurality of reservoirs 125 included in printing block 120. In some exemplary embodiments, a pair of reservoirs 125 surrounds each printing head 20 and supplies material to its printing head, so that each printing head 20 is feed by two reservoirs 125. According to some embodiments of the present invention, carriage 150 includes more pre-heat chambers 130 than printing heads and at least one of printing heads 20 simultaneously receives supply from two different pre-heating chambers 130. Typically, each pre-heating chamber 130 directs material to a different reservoir 125. According to some embodiments of the present invention, each printing head 20 includes at least two arrays of nozzles 124 and each reservoir 125 is in fluid communication with a dedicated array of nozzles 124. To dispense the building material, a voltage signal is applied to the printing heads 20 to selectively deposit droplets of material via printing head nozzles 124. The dispensing rate of each head 20 depends on the number of nozzles 124, the type of nozzles and the applied voltage signal rate (frequency). In some exemplary embodiments, each of printing heads 20 (or at least one of printing heads 20) receives building material from two different pre-heat chambers and material from each pre-heat chamber is dispensed by a dedicated array of nozzles 124.

Figure 2:
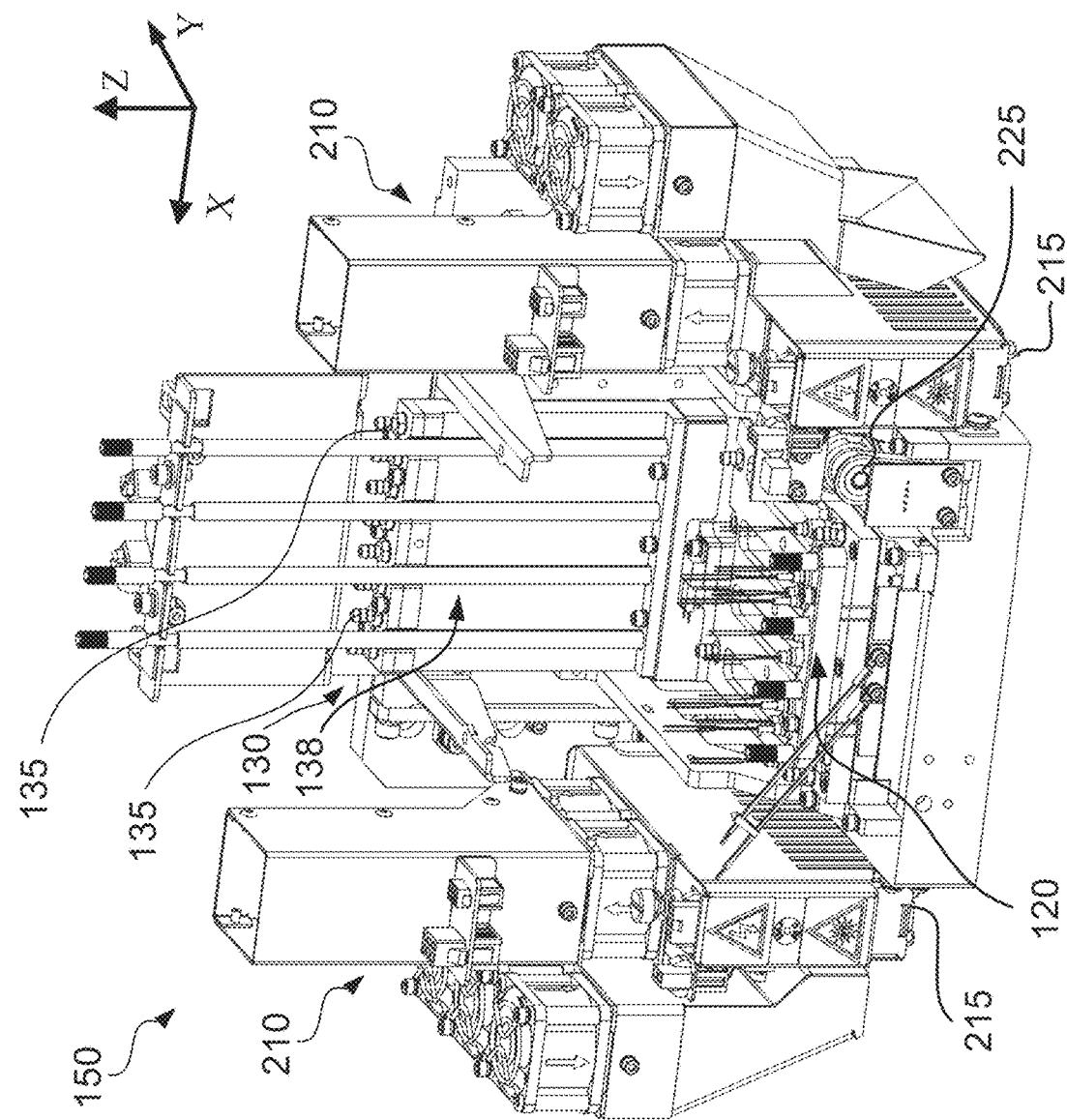
FIG. 2 is a front perspective view of an exemplary carriage in accordance with some embodiments of the present invention.

Reference is now made to FIG. 2 showing an exemplary front perspective view of a carriage in accordance with some embodiments of the present invention. Carriage 150 includes printing block 120, a pre-heating assembly 138 including a plurality of pre-heat chambers 130 (FIG. 1), a pair of hardening units 210 positioned on either side of block 150 in the X direction, and a leveling device 220 (FIG. 1) typically connected to and operated with a pulley system 225. Typically hardening units 210 are ultra-violet (UV) modules that emit UV beams through a radiation window 215.

Building material introduced to carriage 150 is first received by pre-heating assembly 138 via inlets 135. Optionally, pre-heating assembly 138 includes eight inlets 135 for receiving up to eight different types of materials, e.g. modeling and support material. Material received in pre-heating assembly 138 is typically heated to a defined temperature prior to supplying the material to printing block 120. Printing block 120 typically includes a plurality of printing heads 20.

Reference is now made to FIGS. 3A-3B showing exemplary front and back perspective views of internal components of a pre-heater for an AM system in accordance with some embodiments of the present invention. According to some embodiments of the present invention, each chamber 130 in assembly 138 includes a worm screw-shaped runner 131 around which material is directed through chamber 130. Optionally, assembly 138 includes eight chambers 130 for simultaneously receiving up to eight different materials. Typically, a diameter of worm 131 closely matches a diameter of chamber 130 so that material introduced into chamber 130 follows the spiral path provided by worm 131 to reach an outlet of chamber 130 through a pre-heat cartridge 136. The spiral path increases a path length that the material is required to take. This increase in path length allows longer heat exchange.

Optionally, worm 131 is formed from heat conductive material and contact between the material and worm 131 improves heat transfer. The present inventors have found that worm 131 provides for significantly increasing the path length of material while occupying a relatively small footprint. By reducing the footprint, more chambers 130 and thereby a larger variety of building material can be included on a same size carriage 150. The present inventor has found that eight pre-heat chambers fit on a carriage size that would otherwise typically hold four pre-heat chambers when using pre-heating assembly 138. Typically, pre-heat assembly 138 heats contents of all chambers 130 to or near jetting temperature before entering the printing head reservoirs so that the material can be ready for jetting also at high throughput. Optionally, pre-heating assembly 138 may selectively heat each or a portion of the chambers to a different temperature.

According to some embodiments of the present invention, pre-heating assembly 138 includes a heating plate 132 that heats contents in each chamber 130 of assembly 138. Optionally, heating plate 132 is a 54 Watt heater that is covered with a thermal insulator 133 on a surface opposite the surface facing chambers 130. Typically, assembly 138 additionally includes a temperature sensor 134 for monitoring the temperature of assembly 138. In some exemplary embodiments, a duration of heat exchange in assembly 138 is controlled by controlling temperature of plate 132. Typically, inlets 135 are formed through flange 137 and sealed with o-rings.

Figure 4A:
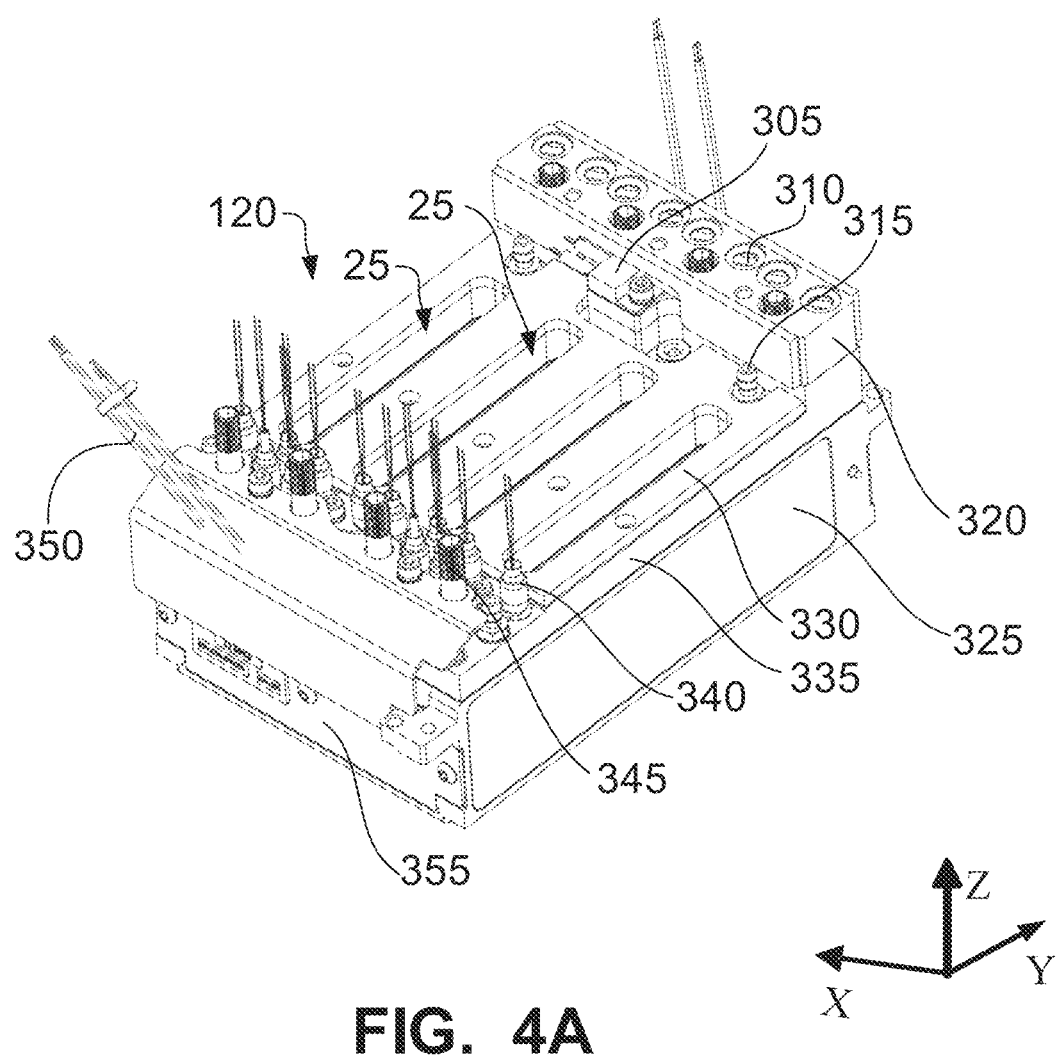
FIG. 4A is a perspective view of a printing block in accordance with some embodiments of the present invention.
Figure 4B:
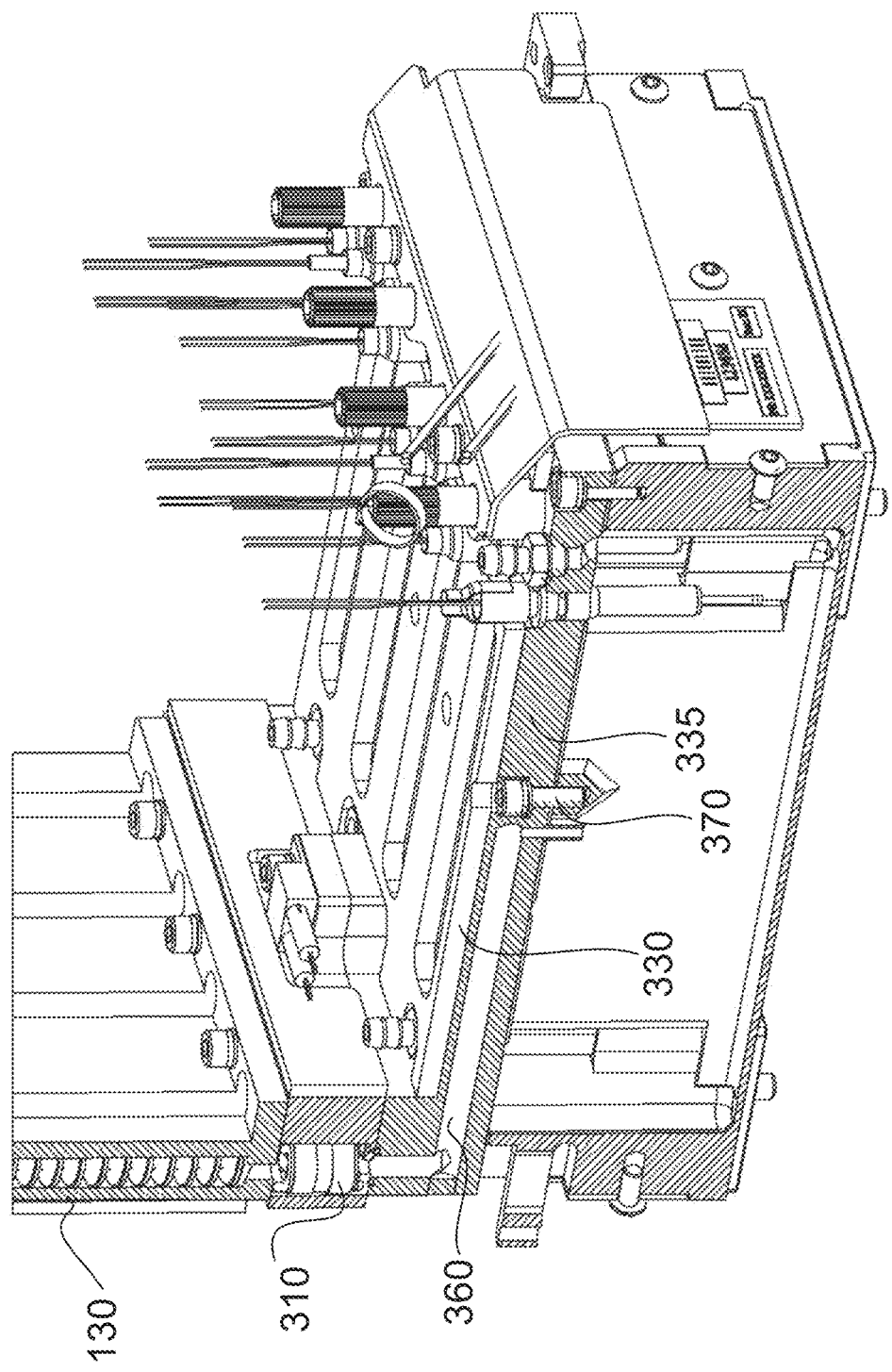
FIG. 4B is a cross sectional side perspective view of the printing block cut along a length of a printing head slot in accordance with some embodiments of the present invention.

Reference is now made to FIGS. 4A-4B showing a perspective view of parts of a printing block assembly, FIG. 4A showing perspective view of a printing block and FIG. 4B showing a cross sectional side perspective view cut along a length of a printing head slot in accordance with some embodiments of the present invention.

According to some embodiments of the present invention, pre-heating assembly 138 is mounted on manifold 320 including a check valve 310 for each chamber 130. Manifold 320 controls delivery of material to printing block 120 and also prevents unwanted dripping while a chamber 130 is not in use. In some exemplary embodiments, printing block 120 is installed with a plurality of vacuum inlets 315 for evaluating required inlet amounts. Optionally, printing block 120 includes one vacuum inlet 315 per printing head 20. Alternatively, printing block 120 includes one vacuum inlet 315 per pre-heat chamber 130.

Optionally, printing block 120 includes a block base 325, a block cover 335 and a top insulator 330 all of which define a plurality of slots 25 for inserting each of printing heads 20. Typically, each printing head is secured into a slot 25 with spring loaded lock screws 345, e.g. secured with a pair of spring loaded lock screws 345, one on either side of slot 25. Typically, printing block 120 is heated to maintain material accumulated in printing block 120 at a desired temperature. Optionally, heating is provided with heating plate 355 installed on two oppositely facing block sides spaced along a Y direction. Optionally heating plate 355 is a 44 Watt heater. Typically, heat level is monitored with block temperature sensors 350 installed near each heating plate 355. In addition, a plurality of thermistors 340 detects temperature of material in reservoirs surrounding printing head slots 25.

According to some embodiments of the present invention, each slot 25 is surrounded by two reservoirs formed in print block base 325. The reservoirs are shown and described in more details in reference to FIGS. 5A and 5B. Optionally, eight thermistors 340 are included to monitor temperature in eight reservoirs surrounding four slots 25. Typically, printing block 120 is also installed with a thermal fuse 305 for safety.

Referring now to FIG. 4B, material from pre-heating assembly 138 reaches the reservoirs in printing block 120 through dedicated channels 360 formed in block cover 335. Typically material from chamber 130 flows through check valve 310 in manifold 320 and channel 360 up to about half way along printing block 120 in Y direction and then drips down through a cover nipple 370 into one of the reservoirs surrounding slot 25. Printing block cover 335 includes dedicated channels connecting each pre-heat chamber 130 to one reservoir in printing block 120. Material reaching the reservoirs is then fed into a defined array of nozzles of a printing head installed in slot 25.

Figure 5A:
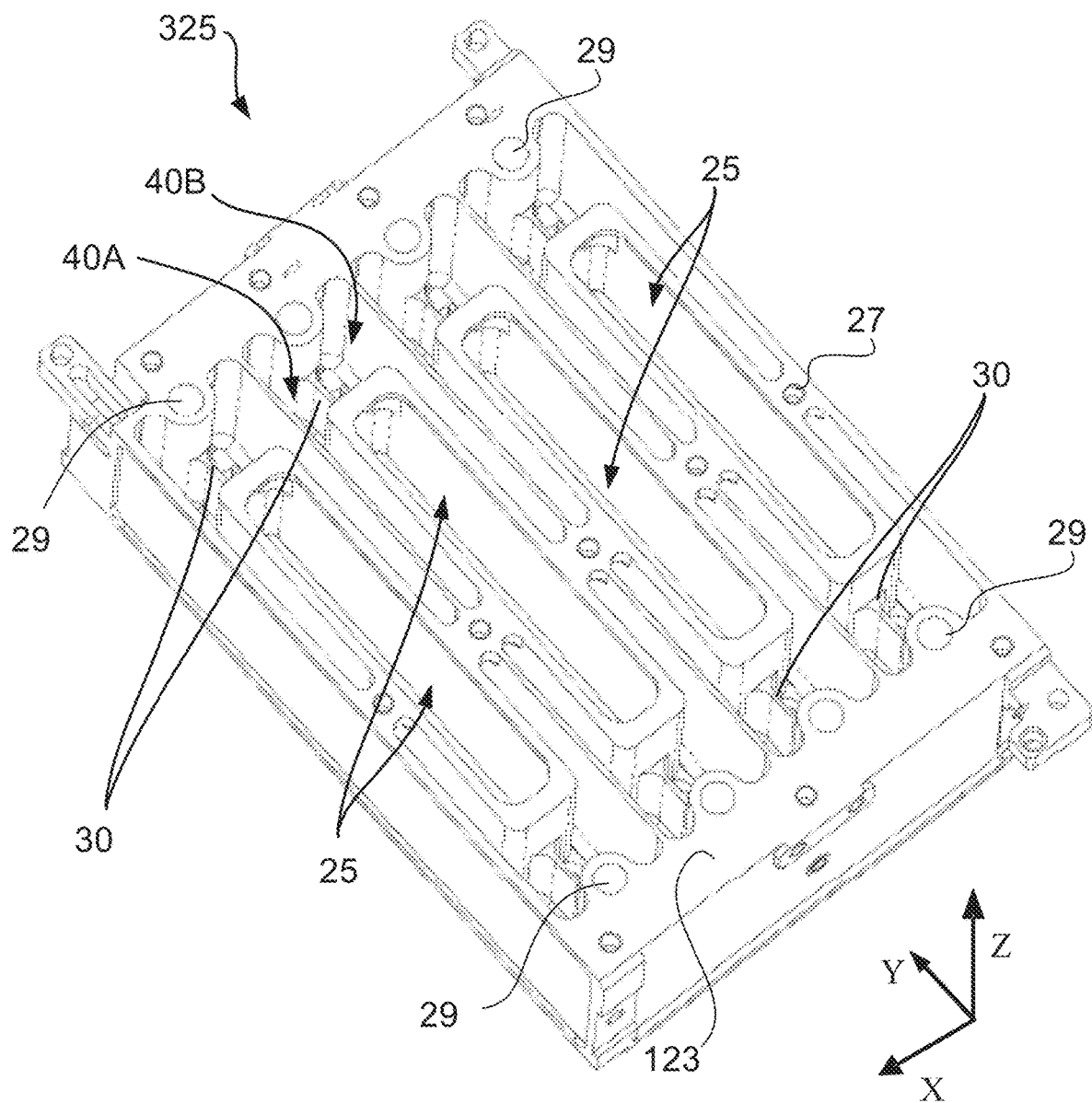
FIGS. 5A-5B are exemplary perspective and top views of a printing block base of an AM system in accordance with some embodiments of the present invention.
Figure 5B:
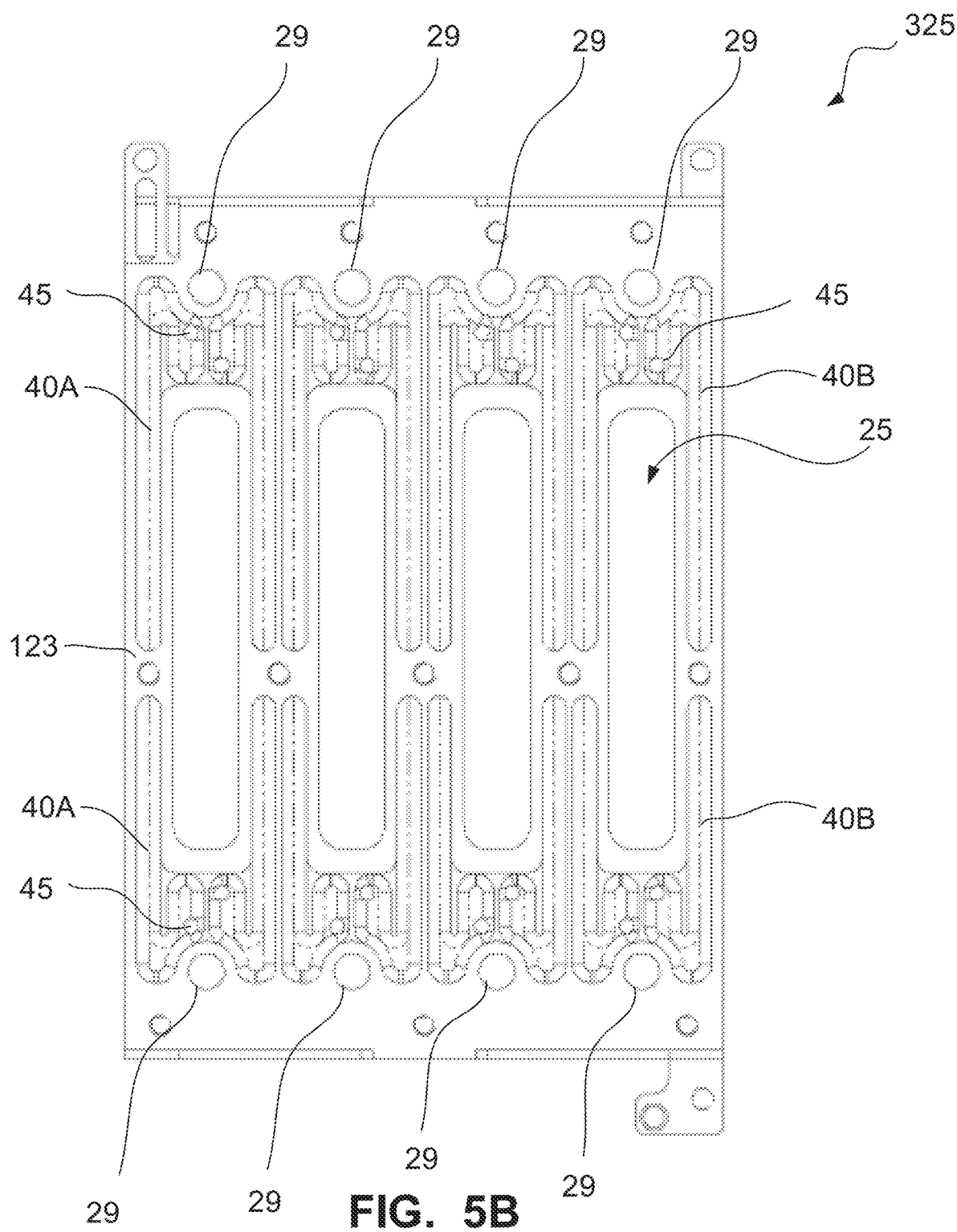

Reference is now made to FIGS. 5A and 5B showing exemplary perspective and top views of a printing block base of an AM system in accordance with some embodiments of the present invention. Printing block base 325 includes a plurality of slots 25 for receiving printing head 20 (FIG. 1), a frame 123 including a plurality of holes 29 for receiving spring loaded lock screw 345 and a plurality of holes 27 for receiving screws to secure printing head 20 in slot 25. According to some embodiments of the present invention, each slot 25 is surrounded by a pair of reservoirs 40, e.g. reservoirs 40A and 40B, extending along a Y direction. Typically, each reservoir 40A and 40B extend below frame 123. According to some embodiments of the present invention, a baffle or barrier wall 30 separates reservoir 40A and from reservoir 40B.

According to some embodiments of the present invention, a height of barrier wall 30 is relatively low so that each of reservoirs 40A and 40B can be filled with different material when the fluid level is defined to be lower than wall 30 or with a same material or a mix of material when the fluid level in reservoirs 40A and 40B is defined to be higher than wall 30. Optionally, thermistors 340 (FIG. 4B) are operated to monitor and control level in each of reservoirs 40. Optionally, one or more level sensors are installed in reservoirs 40 to monitor and control the level of material contained in the reservoirs. Optionally, reservoirs 40 containing support material are typically flooded so that the associated printing head is fully dedicated to printing support material. When only one material is used for a printing head 20, the material may be routed to both reservoirs 40A and 4B of a printing head 20, or only to one of reservoirs 40 and then flooded over wall 30 to provide material in both reservoirs 40A and 4B.

Referring now to FIG. 5B, according to some embodiments of the present invention, each reservoir is shaped as a defined channel with one or more outlets, e.g. typically two outlets 45 through which material is introduced into a printing head 20 (FIG. 1) installed in slot 25. Optionally, an outlet 45 is positioned on each end of reservoir 40, e.g. 40A and 40B, along the Y direction. According to some embodiments of the present invention, reservoir 40A supplies material to a first array of nozzles in a printing head 20 and reservoir 40B supplies material to a second array of nozzles in the same printing head 20. Typically, the first and second arrays do not overlap and both arrays are simultaneously used for printing.

In one exemplary configuration, a pre-heating assembly 138 includes resin with six different colors plus support material that is printed with four printing heads 20.

Optionally, two out of eight pre-heat chambers 130 are fed with support material and the other six chambers are fed with different modeling materials, e.g. different color modeling materials. In this configuration, three of printing heads 20 print with six different colors and one of the printing heads 20 is dedicated for printing the support material.

Figure 6:
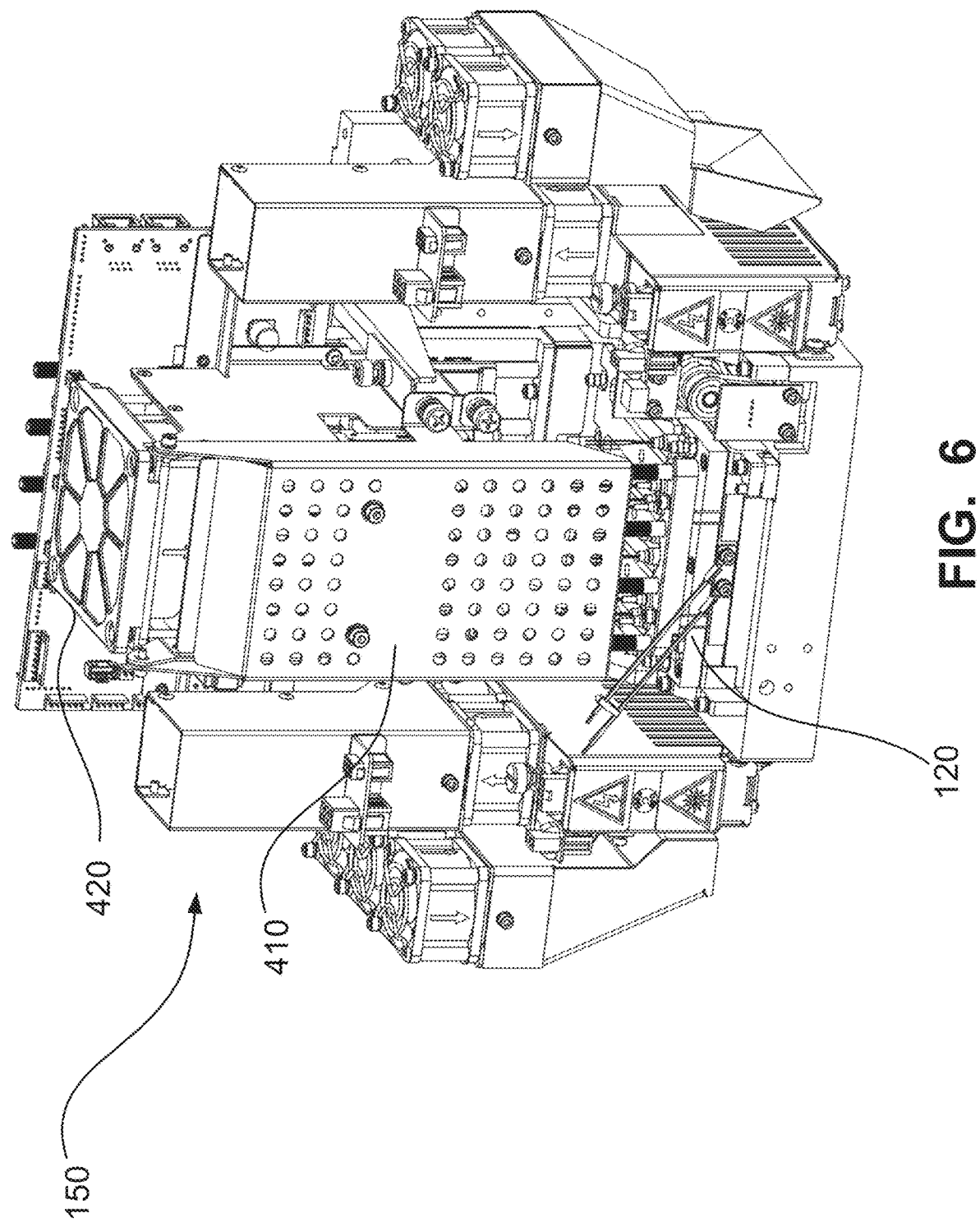
FIG. 6 is an exemplary back perspective view of a carriage for an AM system in accordance with some embodiments of the present invention.
Figure 7:
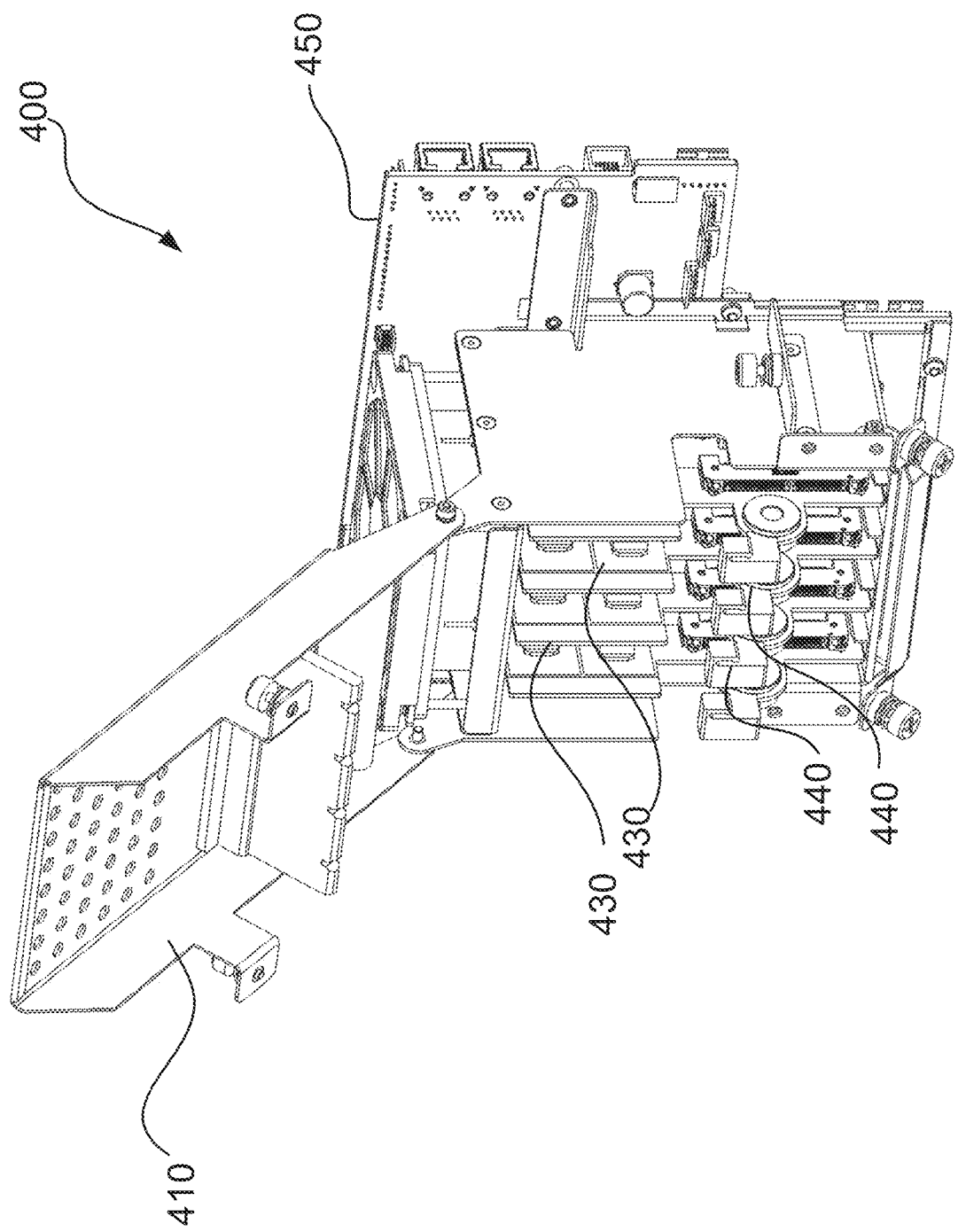
FIG. 7 is an exemplary electronic pack for an AM system in accordance with some embodiments of the present invention.

Reference is now made to FIG. 6 showing an exemplary back perspective view of a carriage and FIG. 7 showing an exemplary electronic pack for an AM system in accordance with some embodiments of the present invention. According to some embodiments of the present invention, a back of carriage 150 includes an electronic pack 400 (FIG. 7) partially covered with a casing 410. Typically, electronic pack 400 includes printing head block board 450, printing head drivers 430 and printing head connectors 440. Printing head connectors 440 connect each printing head 20 to a printing head driver 430. Printing head drivers 430 together with printing head block board 450 include circuitry for controlling printing. Typically, carriage 150 also includes a fan 420 for cooling electronic pack 400.

Figure 8:
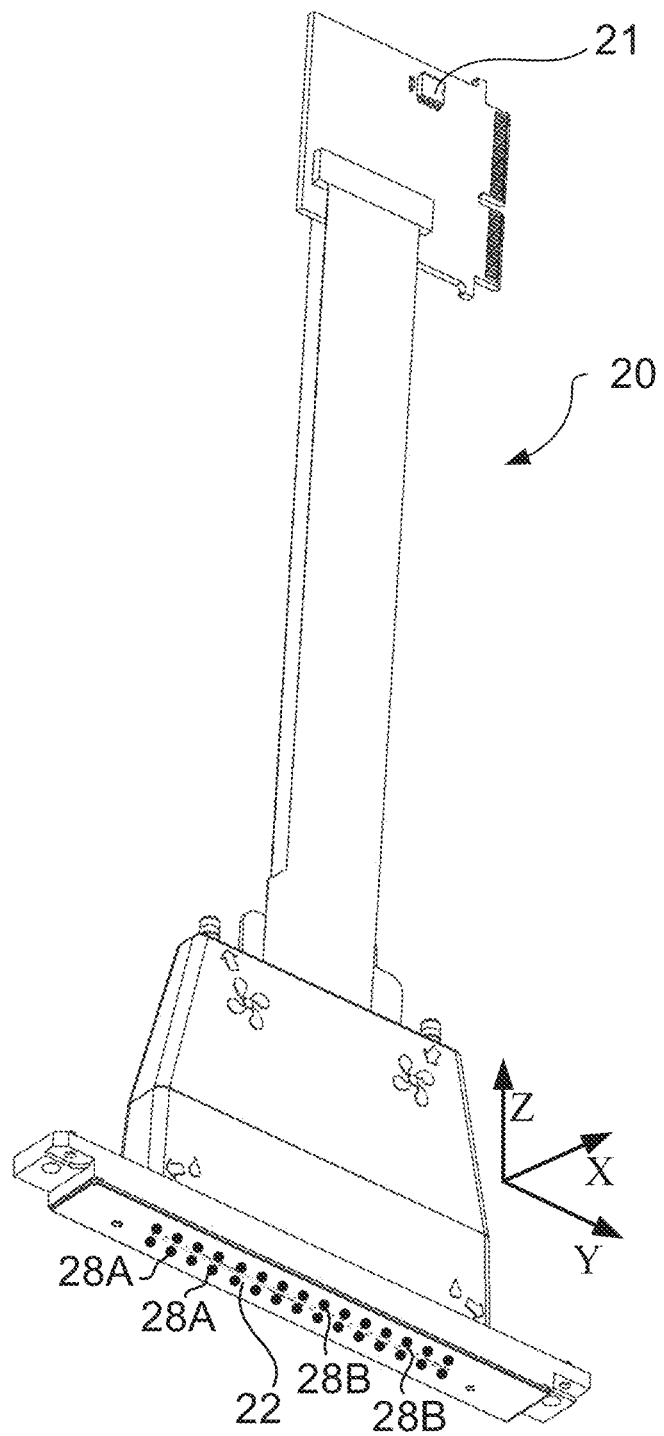
FIG. 8 is an exemplary printing head in accordance with embodiments of the present invention.

Reference is now made to FIG. 8 showing an exemplary printing head in accordance with embodiments of the present invention. According to some embodiments of the present invention, printing head 20 includes a nozzle surface 22 with at least a first array of nozzles 28A and a second array of nozzles 28B. In some exemplary embodiments, material contained in reservoir 40A is directed to first array of nozzles 28A and material contained in reservoir 40B is directed to second array of nozzles 28B. In some exemplary embodiments, printing head 20 includes a single printing head board 21 that is connected to electronic pack 400. Using a single printing head board 21 as opposed to a double printing head board 21 improves the compactness of carriage 150. In addition the board faces sideways, e.g. flat along the Y-Z plane instead of straight, e.g. flat along the X-Z plane.

Figure 9:
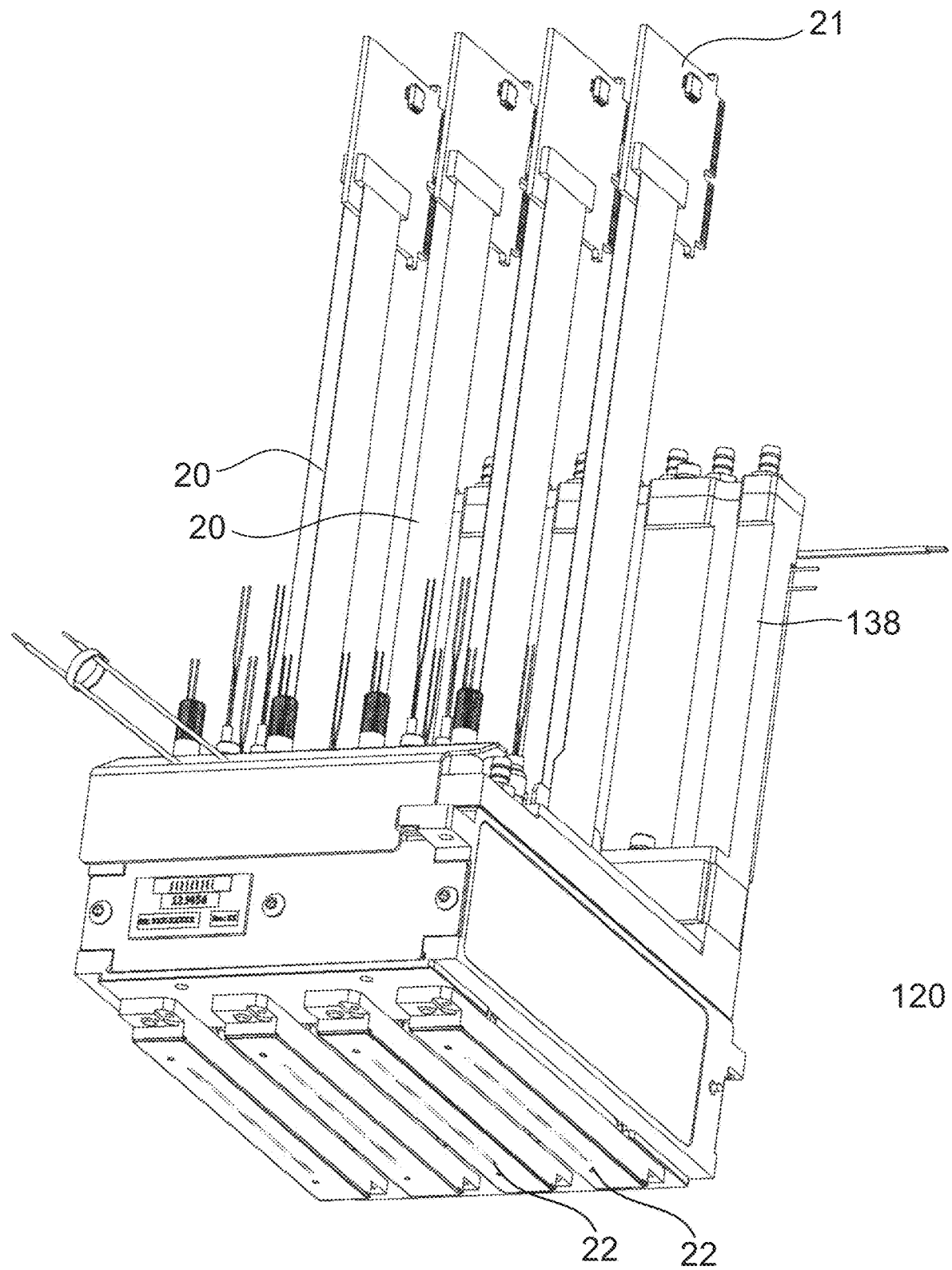
FIG. 9 is an exemplary perspective view of a printing block assembly installed with printing heads in accordance with some embodiments of the present invention.

Reference is now made to FIG. 9 showing an exemplary perspective view of a printing carriage installed with printing heads in accordance with some embodiments of the present invention. A printing head 20 is introduced into each of slots 25 so that nozzle surface 22 is below printing block 120. In one exemplary embodiment, printing block 120 includes slots for four printing heads 20.

It is noted that although many of the embodiments of the present invention have been described in reference to a block cartridge 150 that includes eight pre-heat chambers 130 and four printing heads 20, these numbers are only exemplary and the present invention can also be implemented with a different number of pre-heat chambers 130 and a different number of printing heads 20.

Figure 10:
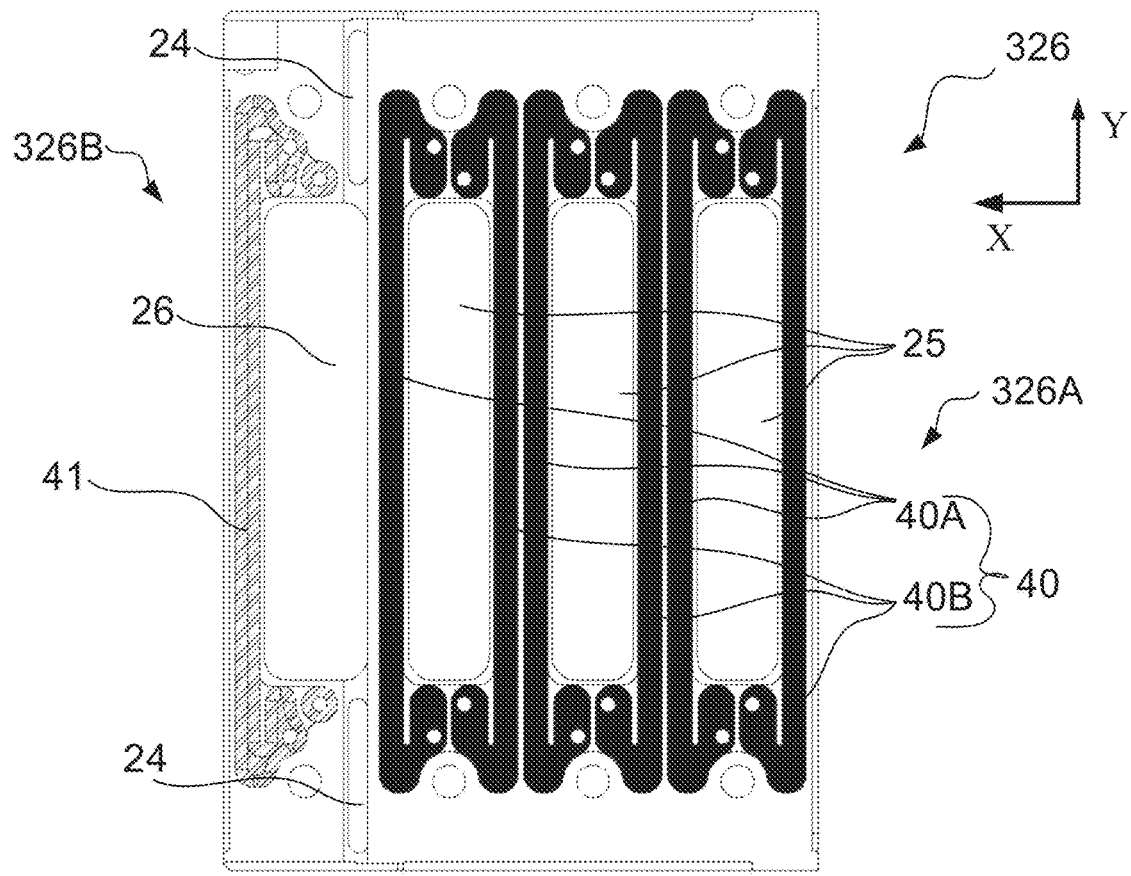
FIG. 10 is an exemplary top view of another printing block base of an AM system in accordance with some embodiments of the present invention.
Figure 11:
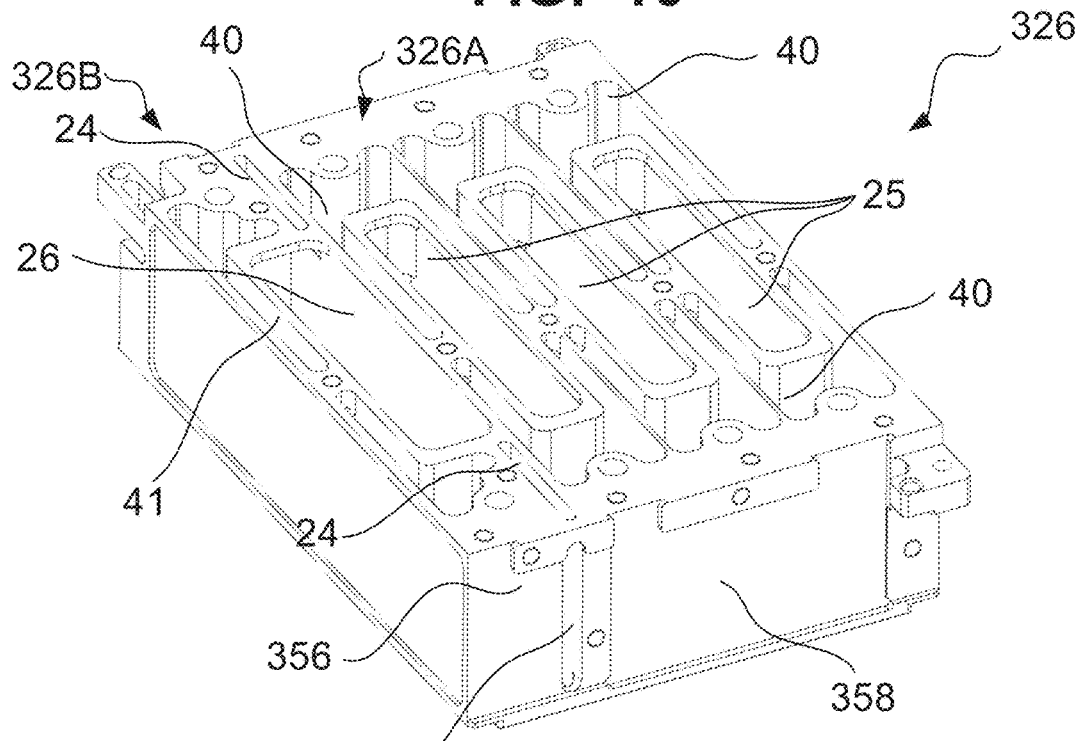
FIG. 11 is an exemplary perspective view of a printing block base installed with two heating plates in accordance with some embodiments of the present invention.

Reference is now made to FIG. 10 showing an exemplary top view of another printing block base of an AM system and to FIG. 11 showing an exemplary perspective view of the printing block base installed with two heating plates both in accordance with some embodiments of the present invention. According to some exemplary embodiments, a printing block base 326 provides for maintaining a portion of the building material deposited in reservoirs 40 at a first temperature and another portion of the building material deposited in reservoir 41 at a second temperature. Typically, printing block base is installed with a first heating plate 358 for heating building material in reservoirs 40 and a second heating plate 356 for heating building material in reservoir 41. Typically, a second set of first heating plate 358 and second heating plate 356 is also installed on an opposite surface of printing block base 326. In between first heating plate 358 and second heating plate 356, a cutout 357 may be placed to reduce heat transfer between the plates. Optionally, printing block 326 includes one or more spaces 24 that reduce heating transfer between reservoirs 40 and reservoir 41. Optionally, reservoir 41 is a single reservoir 41 along a side of slot 26 that is proximal to an edge of printing block base 326 and distal to reservoirs 40. Typically reservoir 41 provides material for a printing head installed in slot 26. Optionally, slot 26 may be larger in volume than slots 25. Distancing reservoir 41 from reservoirs 40 may also help to reduce heat transfer.

In some exemplary embodiments it is desired to maintain modeling material in print block base 326 at a first temperature and to maintain support material at a second temperature. Typically, the support material is maintained at a lower temperature than the modeling material, e.g. 2-10 degrees lower. Alternatively, it may be desirable to maintain one type of modeling material at a different temperature than the others and that one type may be delivered to reservoir 41. Print block base 326 is shown to include two thermally independent sections. Section 326A includes slots 25, reservoirs 40 and heating plates 358 and section 326B includes slot 26, reservoir 41 and heating plates 356. Alternatively, a print block base may include more than two thermally independent sections or two thermally independent that are divided in a different manner, e.g. each section may be associated with more than one slot. Optionally, each slot and corresponding reservoir may be thermally independent from the others so that different material may be simultaneously pre-heated to different temperatures.

Figure 12A:
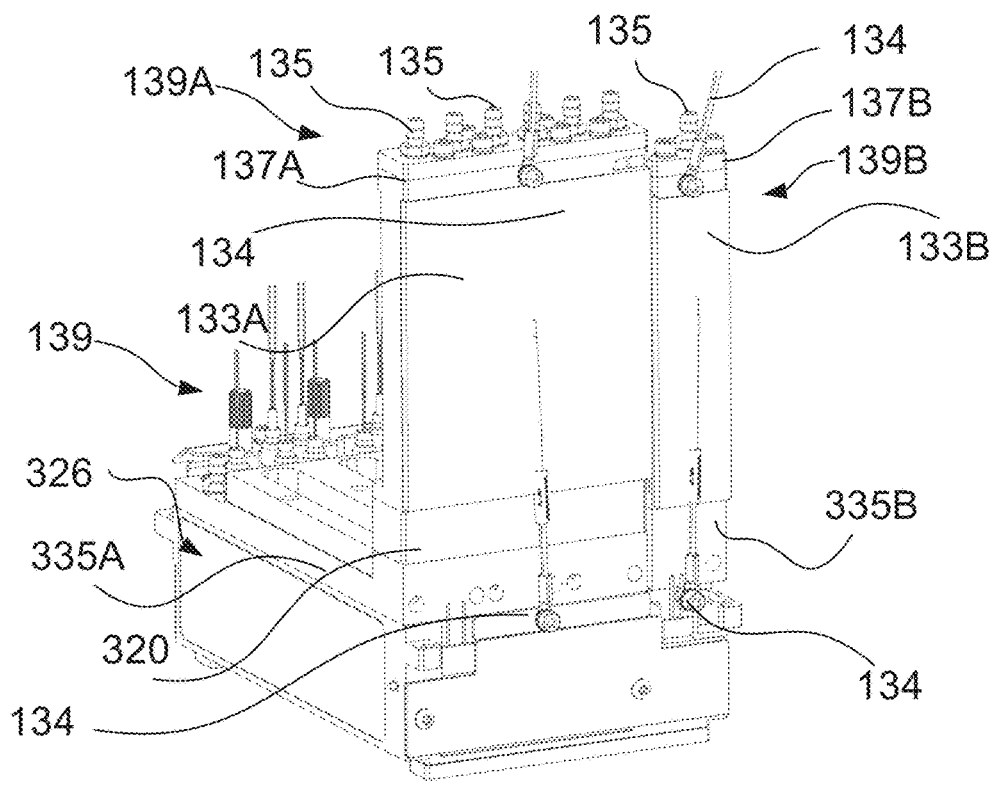
FIG. 12A is a back perspective view showing the components of a printing block assembly in surface contact with a pre-heater assembly for an AM system in accordance with some embodiments of the present invention.
Figure 12B:
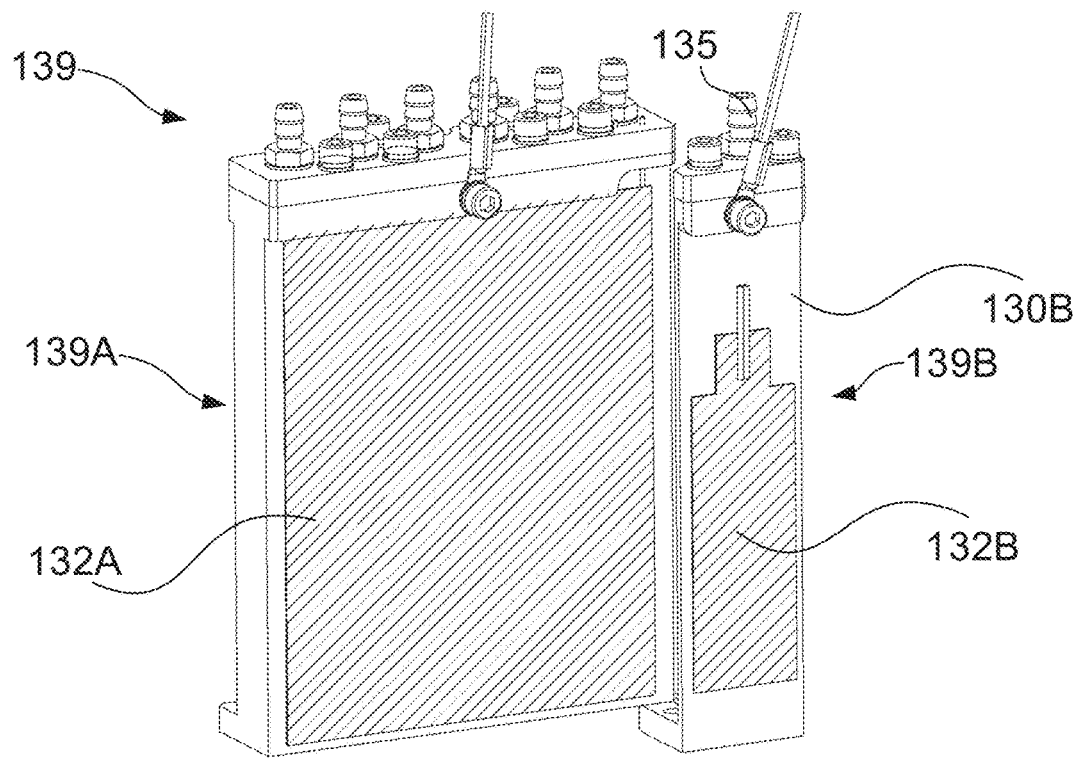
FIG. 12B is a back perspective view showing internal components of a pre-heater for an AM system that is separated into two sections in accordance with some embodiments of the present invention.

Reference is now made to FIG. 12A showing a back perspective view of the components of a printing block assembly in surface contact with a pre-heater assembly for an AM system and to FIG. 12B showing a back perspective view of internal components of a pre-heating assembly for an AM system that is separated into two sections both in accordance with some embodiments of the present invention. According to some embodiments of the present invention, a pre-heating assembly 139 includes a first section 139A with a plurality of pre-heat chambers heated to a first temperature and a second section 139B with at least one pre-heat chamber heated to a second temperature. In some exemplary embodiments flange 137 is also divided into first section 137A through which a plurality of inlets are introduced and a second section 137B through which another inlet 135, e.g. inlet for support material is introduced. According to some exemplary embodiments, each of pre-heating assembly 137A and 137B is mounted on a manifold 320 including check valves for each of the pre-heat chamber.

Typically, each pre-heating assembly 139A and 139B includes its own heating plate 132A and 132B and a dedicated insulator 133A and 133B respectively. In some exemplary embodiments, block cover 335 is also divided into separate units. A first unit 335A covers area on block base 326 for receiving material at the first temperature and second unit 335B covers an area on block base 326 for receiving material at the second temperature. Optionally, heating plate 132B extends over only a portion of pre-heat chamber while heating plate 132A may extend over substantially the entire length of pre-heat chambers 130A. Optionally, heating plate 132B is positioned to be proximal to printing block and distal to inlet 135. Pre-heating assembly 139 is shown to include two thermally independent sections. Section 139A includes chambers 130A, heating plate 132A and insulator 133A and section 139B includes chambers 130B, heating plate 132B and insulator 133B. Likewise other components of the printing block assembly are shown to include two thermally independent sections each including a separated block covers 335 and flanges 137. Alternatively, printing block assembly (including pre-heating assembly 139) may include more than two thermally independent sections or two thermally independent sections that are divided in a different manner, e.g. each section may be associated with more than one material. Optionally, each chamber 130 may be thermally independent from the others so that each material may be pre-heated to a different temperature.

Figure 13:
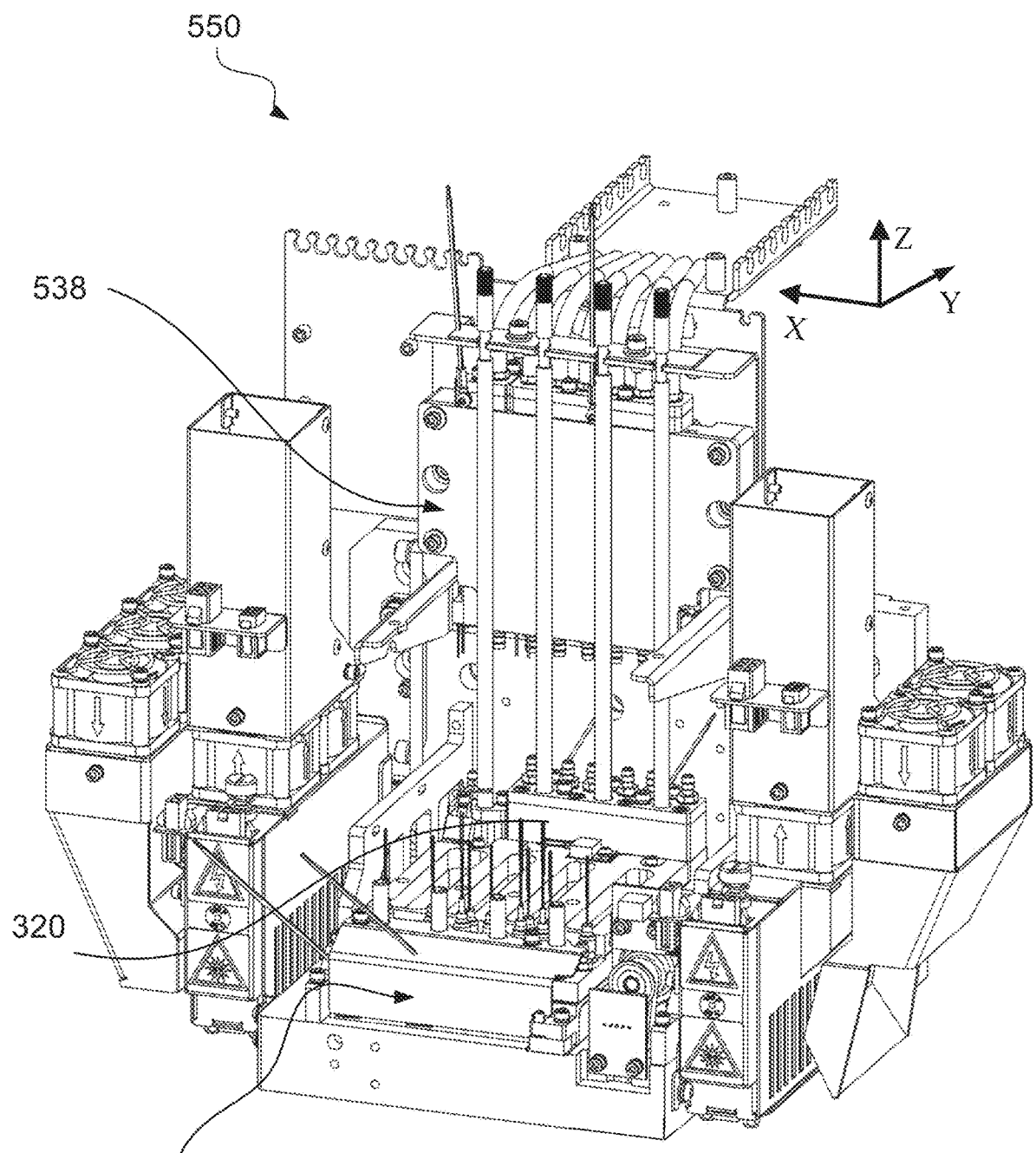
FIG. 13 is a front perspective view of another exemplary carriage in accordance with some embodiments of the present invention.
Figure 14:
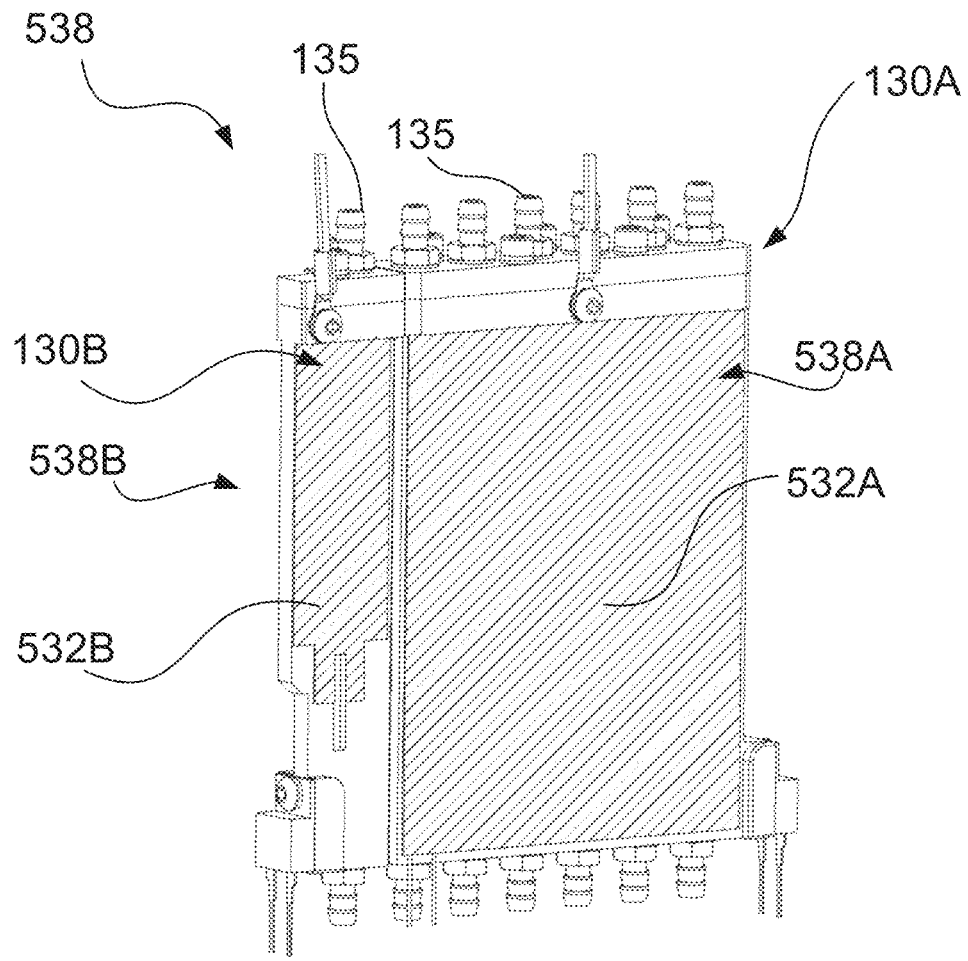
FIG. 14 is a perspective view showing internal components of another pre-heater for an AM system that is separated into two sections in accordance with some embodiments of the present invention.

Reference is now made to FIG. 13 showing a front perspective view of another exemplary carriage and to FIG. 14 showing a perspective view of internal components of another pre-heater for an AM system that is separated into two sections both in accordance with some embodiments of the present invention. According to some embodiments of the present invention, a carriage 550 includes a pre-heating assembly 538 that is separated from and is not directly in contact with manifold 320 (which includes the check valves 310) located on printing block 120. Tubes may be used to connect the channels of the pre-heating assembly 538 to manifold 320. In some exemplary embodiments, pre-heater assembly 538 includes a first section 538A with a plurality of pre-heating chambers heated to a first temperature and a second section 538B with at least one pre-heat chamber heated to a second temperature. Typically, each pre-heating assembly 538A and 538B includes its own heating plate 532A and 532B respectively. Optionally, heating plate 532B extends over only a portion of pre-heat chamber while heating plate 532A may extend over substantially the entire length of pre-heat chambers 130A. Optionally, heating plate 132B is positioned to be proximal to inlet 135. As discussed in reference to FIGS. 12A and 12B pre-heater assembly 538 and manifold 320 may include more than two thermally independent sections or two thermally independent sections that are divided in a different manner. Optionally, each chamber 130 may be thermally independent from the others so that each material may be pre-heated to a different temperature.

Figure 15:
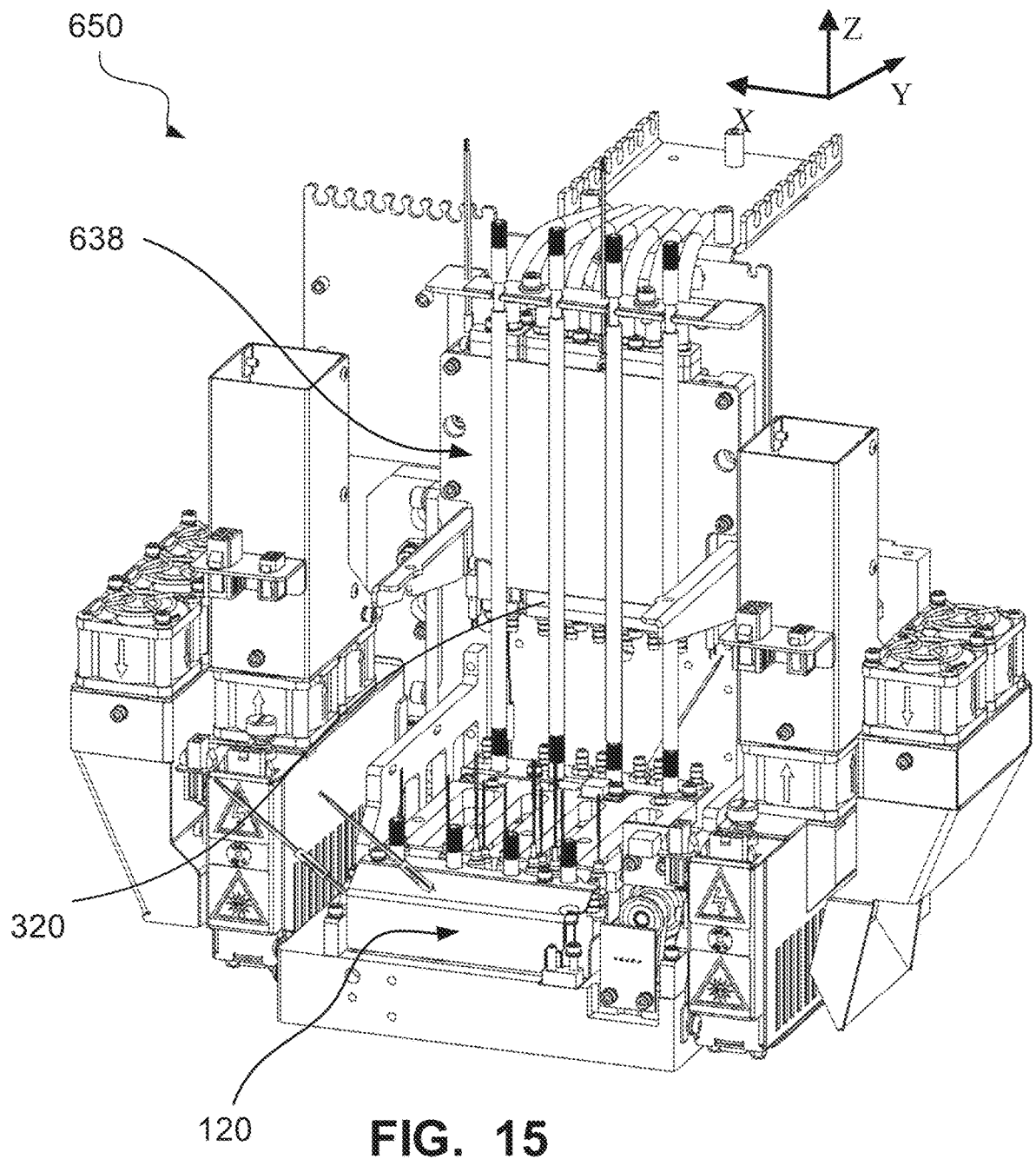
FIG. 15 is a front perspective view of yet another exemplary carriage in accordance with some embodiments of the present invention.
Figure 16:
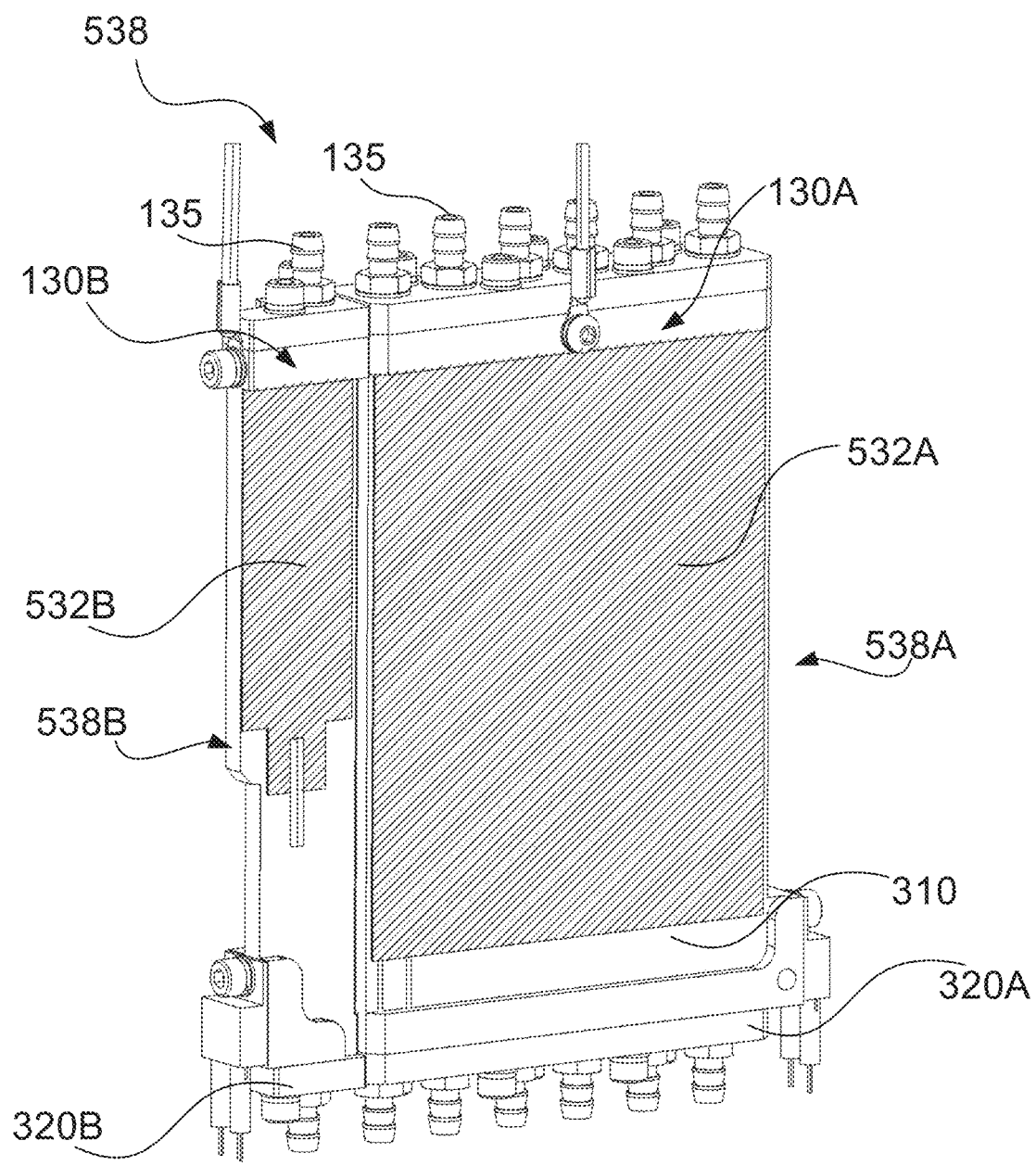
FIG. 16 is a perspective view showing internal components of yet another pre-heater for an AM system that is separated into two sections in accordance with some embodiments of the present invention.

Reference is now made to FIG. 15 showing a front perspective view of yet another exemplary carriage and to FIG. 16 showing a perspective view of internal components of yet another pre-heater for an AM system that is separated into two sections both in accordance with some embodiments of the present invention. According to some embodiments of the present invention, a carriage 650 includes a pre-heating assembly 638 mounted on manifold 320 (including the check valves 310). Pre-heating assembly 638 is separated from and is not directly in contact with printing block 120. Manifold 320 may be divided into a first section 320A through which material that is pre-heated to a first temperature is delivered and a second section 320B through which material that is pre-heated to a second temperature is delivered. Tubes may be used to connect manifold 320 of preheating assembly 638 to printing block 120. In some exemplary embodiments, pre-heating assembly 538 includes a first section 538A with a plurality of pre-heat chambers heated to a first temperature and a second section 538B with at least one pre-heat chamber heated to a second temperature. Typically, each pre-heating assembly 538A and 538B includes its own heating plate 532A and 532B respectively. Optionally, heating plate 532B extends over only a portion of pre-heat chamber while heating plate 532A may extend over substantially the entire length of pre-heat chambers 130A. Optionally, heating plate 132B is positioned to be proximal to inlet 135.

According to embodiments as described for example in reference to FIGS. 10-16, a carriage may simultaneously heat a first set of materials, e.g. modeling material to a first temperature and heat a second material, e.g. support material to a second temperature so that both the first and second material may be simultaneously deposited each at a temperature that is suitable for that material. In some exemplary embodiments, a same printing block base is used and the different temperatures are controllably achieved without significantly increasing the footprint of the printing block base. The carriage may include more than two thermally independent sections or two thermally independent sections each of which include more than one material passing though. Optionally, each chamber 130 may be thermally independent from the others so that each material may be pre-heated to a different temperature while for example simultaneously printing with all the materials.

Figure 17:
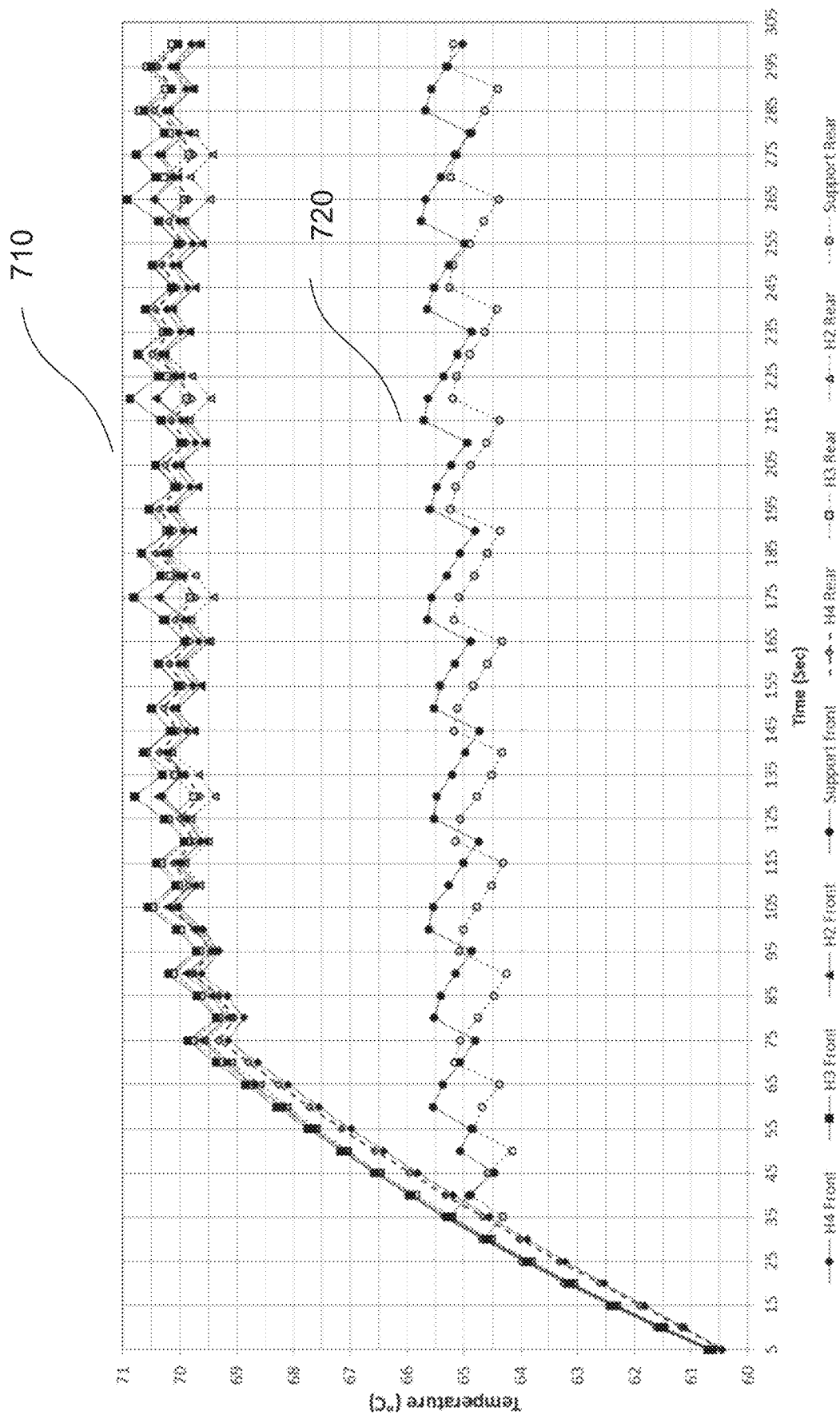
FIG. 17 is a graph showing the temperature behavior over time in various locations of a printing block in accordance with some embodiments of the present invention.

Reference is now made to FIG. 17 presenting a graph showing the temperature behavior over time in various locations of a printing block in accordance with some embodiments of the present invention. Curves 710 show exemplary temperatures measured over time at two opposite ends along the Y axis of the walls around slots 25 and reservoirs 40 (FIG. 10). Curves 720 show exemplary temperatures measured over time at two opposite ends along the Y axis of the walls around slot 26 and reservoir 41 (FIG. 10). As can be seen, the temper around slot 26 and reservoir 41 were maintained at a steady temperature below the temperatures around slots 25, as desired. In addition, the temperatures around slots 25 and reservoirs 41 were also maintained at a steady temperature, as desired. In specific embodiments of the present invention, the temperature around slots 25 and reservoirs 40 is maintained at about 70° C., while the temperature around slot 26 and reservoir 41 is maintained at about 65° C.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method comprising:
heating a plurality of different building materials in separate chambers;
simultaneously delivering contents of each of the plurality of different materials to a plurality of reservoirs formed in a printing block, wherein each reservoir at least partially surrounds a printing head installed in said printing block and is configured to feed said printing head with a building material of said plurality of different building materials; and
dispensing all the plurality of different materials with printing heads of said printing block by three dimensional inkjet printing.

2. The method of claim 1, wherein there is a pair of reservoirs surrounding each printing head and the method comprising simultaneously directing different materials from the pair of reservoirs to separate nozzle arrays of the printing head.

3. The method of claim 1, comprising directing the material from the base of a pre-heater worm screw via a dedicated block cover channel to a printing head reservoir.

4. The method of claim 1, wherein one of the plurality of different materials is heated to a first temperature and another of the plurality of different materials is heated to a second temperature.

5. The method of claim 4, wherein the one of the plurality of different materials is support material and the other of the plurality of different materials is modeling material.

6. The method of claim 5, wherein the support material is heated to a temperature that is 2-10 degrees lower than the modeling material.

7. The method of claim 5, wherein the support material is heated and maintained at a temperature of 65° C. and the modeling material is heated and maintained at a temperature of 70° C.

8. The method of claims 4, wherein yet another of the plurality of different materials is heated to a third temperature.

9. A method comprising:
providing an additive manufacturing (AM) system comprising a pre-heating assembly and a printing block in a carriage, the pre-heating assembly including a plurality of chambers and the printing block including a plurality of slots for receiving a plurality of printing heads and a pair of reservoirs at least partially surrounding each of the plurality of slots;
heating a plurality of different materials, wherein each of the plurality of different materials is heated in a separate chamber of the pre-heating assembly;
simultaneously delivering contents of all the plurality of different materials from the pre-heating assembly to said plurality of printing heads, wherein each material of the plurality of different materials from the pre-heating assembly is directed to a printing head via a respective reservoir, wherein each reservoir is configured to feed a respective printing head with a respective material; and
dispensing all the plurality of different materials with the plurality of printing heads by three dimensional inkjet printing, wherein each of the plurality of printing heads is configured to receive material from the pair of reservoirs and to dispense the material from each reservoir with a separate nozzle array.

10. The method of claim 9, wherein at least one of the plurality of chambers includes a pre-heater worm screw and wherein the pre-heater worm screw directs material out of the at least one of the plurality of chambers.

11. The method of claim 9, wherein each of the plurality of chambers is in fluid communication with one of the reservoirs.

12. The method of claim 9, comprising heating each chamber by a separate heating element.

13. The method of claim 9, wherein the pair is separated by a separating wall.

14. The method of claim 13, wherein the separating wall is configured to allow selected flooding between the pair of reservoirs.

15. The method of claim 9, wherein one of the plurality of different materials is heated to a first temperature and another of the plurality of different materials is heated to a second temperature.

16. The method of claim 15, wherein the one of the plurality of different materials is support material and the other of the plurality of different materials is modeling material.

17. The method of claim 16, wherein the support material is heated to a temperature that is 2-10 degrees lower than the modeling material.

18. The method of claim 16, wherein the support material is heated and maintained at a temperature of 65° C. and the modeling material is heated and maintained at a temperature of 70° C.

19. The method of claim 15, wherein yet another of the plurality of different materials is heated to a third temperature.

* * * * *